US005528679A

United States Patent [19]

Taarud

[11] Patent Number: 5,528,679

[45] Date of Patent: Jun. 18, 1996

[54] AUTOMATIC DETECTION OF DIGITAL CALL PATHS IN A TELEPHONE SYSTEM

[75] Inventor: Jeff Taarud, San Diego, Calif.

[73] Assignee: Primary Access Corporation, San Diego, Calif.

[21] Appl. No.: 189,066

[22] Filed: Jan. 27, 1994

[51] Int. Cl.[6] .......................... H04M 1/24; H04M 11/00; H04J 1/16

[52] U.S. Cl. .................................. 379/34; 379/1; 379/93; 370/14

[58] Field of Search .................................. 379/1, 34, 10, 379/93, 94, 95, 96, 97; 370/13, 14, 85, 110.1

[56] References Cited

U.S. PATENT DOCUMENTS 5,036,513 7/1991 Greenblatt .............................. 379/96 X 5,390,245 2/1995 Dent et al. .............................. 379/95 X

*Primary Examiner*—Stephen Chin
*Assistant Examiner*—Paul Loomis
*Attorney, Agent, or Firm*—Fish & Richardson

[57] ABSTRACT

A method and apparatus for determining whether a sufficiently clear digital path exists from a first end user to a second end user when connecting a call over a switched telephone network. Once the determination is made, the type of connection that is possible (high speed digital or analog compatible rates) can be determined. The present invention determines the characteristics of a path between two subscribers on a telephone network by transmitting a digital probe along the path. In cases in which an answering subscriber or the intermediate path are incapable of supporting a digital call, communication in accordance with a standard analog modulation scheme can proceed without having to redial the call.

30 Claims, 15 Drawing Sheets

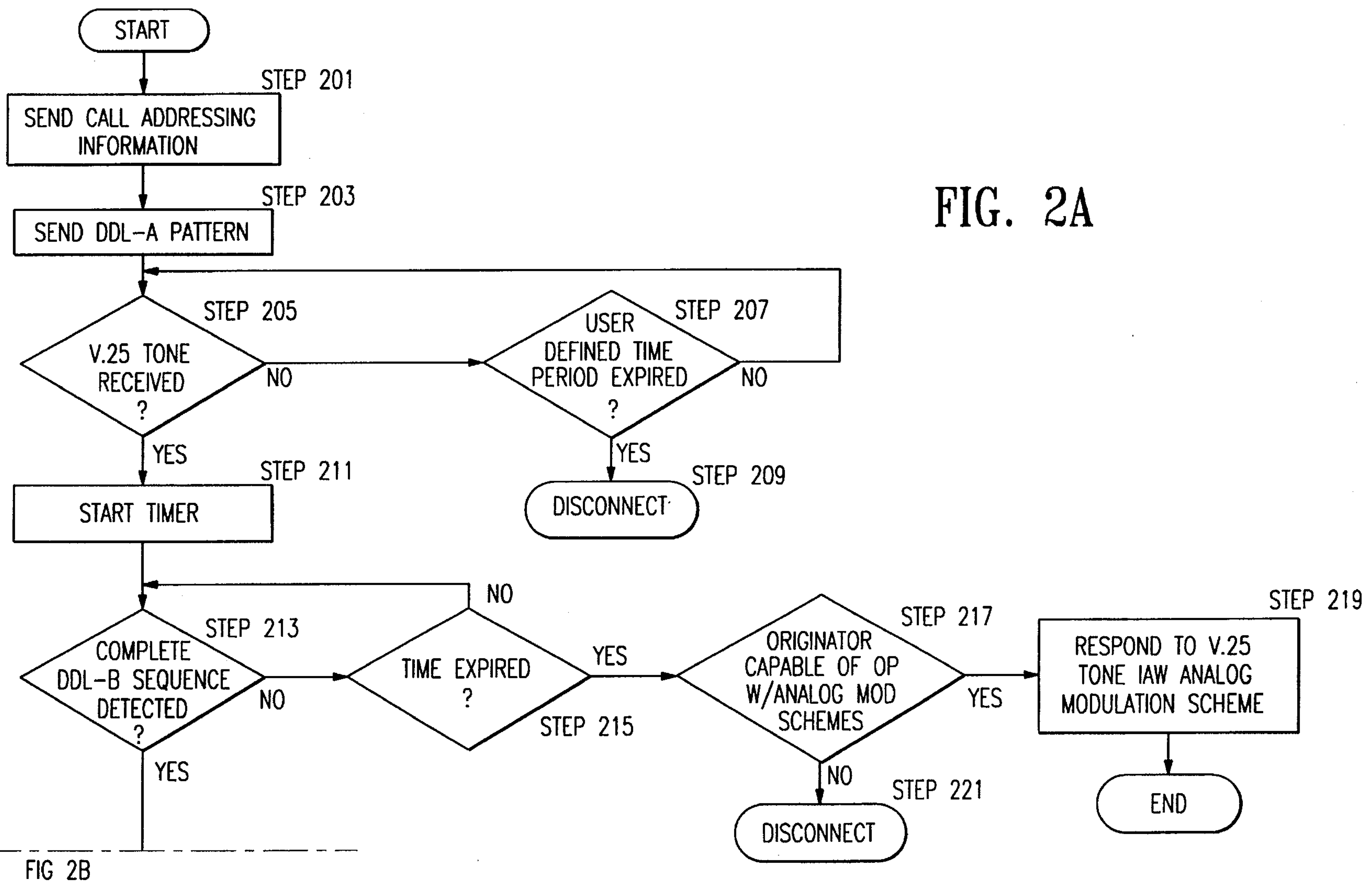
FIG. 2A
START
STEP 201
SEND CALL ADDRESSING INFORMATION
STEP 203
SEND DDL-A PATTERN
STEP 205
V.25 TONE RECEIVED ?
NO
YES
STEP 207
USER DEFINED TIME PERIOD EXPIRED ?
NO
YES
STEP 209
DISCONNECT
STEP 211
START TIMER
STEP 213
COMPLETE DDL-B SEQUENCE DETECTED ?
NO
YES
FIG 2B
STEP 215
TIME EXPIRED ?
NO
YES
STEP 217
ORIGINATOR CAPABLE OF OP W/ANALOG MOD SCHEMES
YES
NO
STEP 221
DISCONNECT
STEP 219
RESPOND TO V.25 TONE IAW ANALOG MODULATION SCHEME
END

ORDER OF BIT TRANSMISSION →

ORDER OF SAMPLE TRANSMISSION ↓

ALIGNED SAMPLES

| | | | | | | | |
|---|---|---|---|---|---|---|---|
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |

FIG. 3

ORDER OF BIT RECEPTION →

| | | | | | | | |
|---|---|---|---|---|---|---|---|
| 1 | 0 | 0 | X | X | X | X | X |
| 1 | 0 | 0 | X | X | X | X | X |
| 0 | 0 | 0 | X | X | X | X | X |
| 0 | 0 | 0 | X | X | X | X | X |

ORDER OF SAMPLE RECEPTION →

401

X INDICATES " DON'T CARE " BINARY VALUES

FIG. 4A

ORDER OF BIT TRANSMISSION →

| | | | | | | | | |
|---|---|---|---|---|---|---|---|---|
| D | O | O | X | X | X | X | X | 8 KBPS PER SECOND |
| D | D | X | X | X | X | X | X | 16 KBPS PER SECOND |
| D | D | D | X | X | X | X | X | 24 KBPS PER SECOND |
| D | D | D | D | X | X | X | X | 32 KBPS PER SECOND |
| D | D | D | D | D | X | X | X | 40 KBPS PER SECOND |
| D | D | D | D | D | D | X | X | 48 KBPS PER SECOND |
| D | D | D | D | D | D | D | X | 56 KBPS PER SECOND |
| D | D | D | D | D | D | D | D | 64 KBPS PER SECOND |

X INDICATES " DON'T CARE " BINARY VALUES

FIG. 6

■ INDICATES WHERE TIMER STOPS WHEN NEXT PHASE IS ENTERED. ( TIMERS NOT TO SCALE )

(d) A MINIMUM NUMBER OF SCRAMBLED 1'S DATA BITS AT THE NEGOTIATED RATE MUST BE DETECTED BEFORE GOING TO DATA MODE.

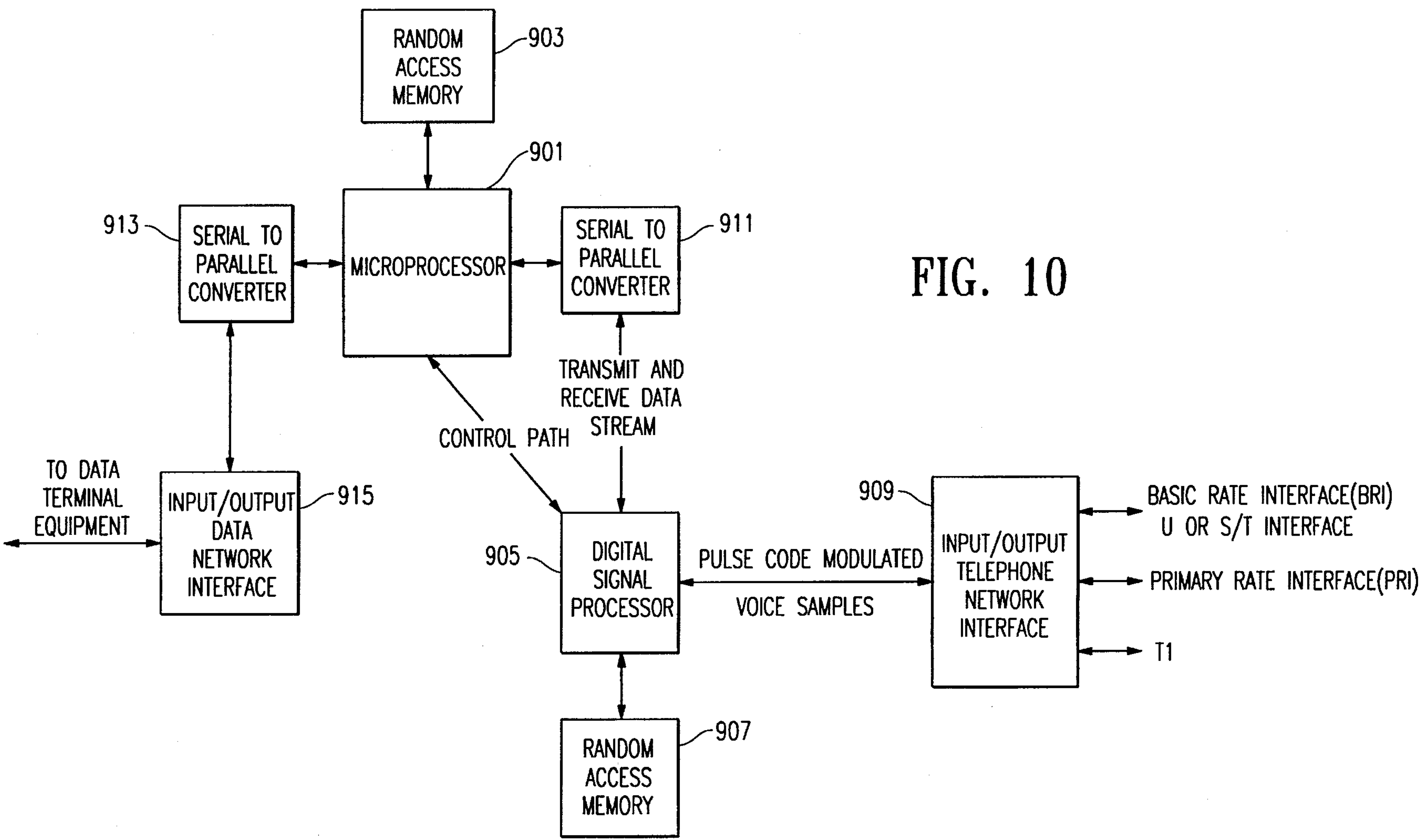
RANDOM ACCESS MEMORY
903
901
913
SERIAL TO PARALLEL CONVERTER
MICROPROCESSOR
SERIAL TO PARALLEL CONVERTER
911
FIG. 10
TRANSMIT AND RECEIVE DATA STREAM
CONTROL PATH
TO DATA TERMINAL EQUIPMENT
INPUT/OUTPUT DATA NETWORK INTERFACE
915
909
INPUT/OUTPUT TELEPHONE NETWORK INTERFACE
BASIC RATE INTERFACE(BRI)
U OR S/T INTERFACE
PRIMARY RATE INTERFACE(PRI)
T1
905
DIGITAL SIGNAL PROCESSOR
PULSE CODE MODULATED
VOICE SAMPLES
RANDOM ACCESS MEMORY
907

AUTOMATIC DETECTION OF DIGITAL CALL PATHS IN A TELEPHONE SYSTEM

BACKGROUND OF THE INVENTION

1. Field of the Invention

This invention relates to data communications over a general switched telephone network, and more particularly to a method and apparatus for determining whether a sufficiently clear path exists through a general switched telephone network for digital communication between a first and a second endpoint on a telephone system.

2. Description of Related Art

Telecommunications is currently undergoing a dramatic change due to the transition from analog technology to digital technology in the general switched telephone network (GSTN). Digital telephone service, such as integrated services digital network (ISDN) service, is becoming available in a number of regions or "islands." As digital telephone service becomes available to more telephone service subscribers, a number of advantages and challenges are generated.

In a traditional analog link, information is transmitted by a subscriber's equipment (typically a telephone or modem) as an analog signal. Presently, for an interoffice call, it is typical for the analog signal to be routed to a central office, where the analog signal is converted to a digital signal by a coder/decoder (CODEC) device. A CODEC is essentially an analog-to-digital/digital-to-analog converter which samples the analog signal at a predetermined rate in a first direction, and receives and decodes a digital data stream of samples in a second direction. In the first direction, the output of the CODEC is a stream of digital words ("samples") that are each representative of the weighted amplitude of the received analog signal at particular sample times. The samples output by the CODEC can then be switched by digital switches and routed to a second central office to which a second party to the call is connected. In the second direction, the output of the CODEC is the analog signal represented by the received stream of samples. A CODEC at the second central office operates in a similar manner to encode an analog signal received from a second subscriber and decode the stream of samples received from the CODEC at the first central office.

However, it is currently becoming common for information to be placed onto the telephone system in digital form. That is, the subscriber's equipment outputs "end user digital information" that is accepted by the telephone system. The end user digital information, having already been converted to digital form in the subscriber's equipment, does not pass through a CODEC. Rather the end user digital information is directly switched by the digital switching equipment at the central office. A digital signal including the end user digital information is then routed to the central office associated with the party receiving the call. That central office then extracts the end user digital information from the received digital signal and switches the end user digital information directly to the receiving party. In the context of the present invention, the term "samples" refers to end user digital information as well as the output of devices such as CODECs, even though such end user digital information is not necessarily a "sample" of an analog signal.

One advantage that comes from the subscriber directly placing end user digital information on the telephone system is that digital information can be transmitted between the subscribers directly in digital form. Therefore, there is no need to modulate information that is already in digital form onto an analog signal. A further advantage is that it is possible to communicate at higher data transfer rates with much lower bit error rates, since digital signals are less susceptible to interference due to environmental noise and limited bandwidth than are analog signals (such as signals output by modems). Modems that are used with POTS are limited by practical considerations to data transfer rates of less than 30 kbps. Therefore, the amount of information per unit time that can pass through an analog telephone connection is limited.

However, because the current telephone infrastructure is an elaborate and extensive network, a transition from analog services to all digital service will take several years. Therefore, as the transition is being made, there will be areas in which digital service is available to a subscriber, and areas in which only analog service will be available to a subscriber. Furthermore, the routing of a call through the GSTN is complex and may include a number of legs. Each such leg may include analog equipment. Each call may be routed differently at different times, even if made by the same first subscriber to the same second subscriber. This means that a subscriber who wishes to originate a call to another subscriber for the purpose of transmitting and receiving end user digital information must know the capabilities of the telephone equipment between the two subscribers involved in that particular call before that subscriber can determine the most appropriate data transfer method and rate for the transmission. There is currently no way for a subscriber to determine whether analog or digital equipment is being used along the path of a call that is made through the GSTN.

FIG. 1 is an illustration of five subscribers of telephone service. Currently, end user digital information can be transmitted from one subscriber to another over circuit switched facilities using one of three methods. The first method requires each subscriber to have a modem. The modem modulates end user digital information using an analog modulation scheme (such as V.22bis, V.32, etc.). The received signal is demodulated by an inverse operation. A call can be placed and data transmitted by any subscriber capable of placing a voice call. Likewise, the call can be received and the end user digital information decoded by any subscriber capable of receiving a voice call, if equipped with the appropriate modem. The second method requires that end user digital information be transmitted over switched 56 kbps facilities. End user digital information is sent in digital form over the switched 56 kbps facility to other subscribers using the same service. The third method requires each subscriber to be connected to a Basic Rate Interface (BRI) or Primary Rate Interface (PRI) in the same ISDN "island" (BRIs and PRIs are well established interfaces within the telecommunications industry). An ISDN island refers a collection of subscribers that are capable of making end-to-end ISDN data bearing calls to one another, even if served by a different switch.

In FIG. 1, subscriber A is provided with a BRI 1 from an end office 2. In a BRI, two B-channels and one D-channel are available to the subscriber. The two B-channels each have a native data rate of up to 64 kbps. Each B-channel can transmit either voice or data information. The D-channel has a data rate of up to 16 kbps. The D-channel is typically used for signaling (e.g., call set-up, tear-down, progress indication, etc.), but may be used for transmitting data. Since a BRI has a separate channel for signaling, the entire 64 kbps bandwidth of each B-channel can be used for data.

Subscriber B is also provided with a BRI 4 from a different end office 6. The end offices 2, 6 are within the same ISDN island 8. Therefore, subscriber A can call subscriber B through a digital path and take full advantage of the 64 kbps data transfer rate that is possible between subscribers BRI within the same ISDN.

Subscriber C is provided with a BRI. However, subscriber C is connected to an ISDN island 12 that is not part of the ISDN island 8 to which subscriber A and subscriber B are a part. An ISDN 64 kbps data call between subscriber C and subscriber A or B will fail since subscriber C and subscribers A and B are part of different islands. A second call must then be placed requesting voice capabilities. This is because an ISDN island will not permit a call requested with data bearing capabilities to be made when the path must use GSTN equipment not under the island's control. The ISDN will not allow such a call because within the GSTN 13 the path may be routed through analog equipment, or the digital data transmitted through the GSTN 13 may be altered by signaling arrangements sharing the call path (such as the commonly known "robbed-bit signaling" technique). However, since subscribers A, B and C are each connected to the GSTN 13 through the respective ISDN islands 8, 12, data can be transmitted between subscriber A or B and subscriber C by using a modem.

As shown in FIG. 1, subscriber D can exchange digital data using switched-56 kbps facilities delivered over T1, but then only to specific subscribers of that service. Subscriber D can also exchange digital data with any other subscriber, if an analog modulation scheme is used (i.e., modems are used), but only at a comparatively limited information rate. A digital data call can only be established between subscriber D and other subscribers to the same digital facility.

Subscriber E of FIG. 1 is connected to the GSTN 13 by a POTS line 16. Therefore, subscriber E is limited to transmitting and receiving only analog signals. Analog signals are suitable for voice conversation or modems.

If subscriber A wishes to transfer data between itself and subscriber E, such a transfer would be possible by encoding the information in accordance with a standard analog modulation technique. This requires special circuitry at the subscriber A end of the line, since subscriber A is interfacing with the GSTN 13 through the ISDN island 10 directly in a digital format. Subscriber A encodes the data initially placed on the BRI 1 in the same manner as it would be encoded were the data to have been sent from a standard modem and encoded in a CODEC at the central office. Thus, when the data is decoded at the CODEC at the central office connected to the subscriber E and demodulated by the modem at subscriber E's site, the information will be correct. The equipment at subscriber A must also have knowledge of the capabilities of subscriber E before placing the call. Typically, subscriber A would request a call with 64 kbps bearer channel capabilities. This call would fail, and subscriber A would then have to place a second call requesting voice capabilities. This second call would typically succeed.

As described above, the current state of the art has the following problems:

1. Current state of the art analog modulation schemes are limited to a data exchange rate of 28.8 kbps. Operation above 30 kbps appears to be impracticable at any time in the future.
2. Using switched digital 56 kbps facilities does not allow flexible connection to other subscribers not using the same facility. For example, a switched 56 kbps subscriber cannot interoperate with a subscriber limited to analog modulation schemes.
3. BRIs alone are not sufficient to permit exchange of digital data over the plurality of interfaces available today. As discussed above, BRI subscriber can make digital calls only to BRI subscribers of the same ISDN island.
4. BRIs can interoperate with subscribers limited to analog modulation schemes only if the capabilities of the end subscriber are known before placing a call.
5. ISDNs can provide exchange of digital data only between subscribers of a particular ISDN island. Subscribers in a different ISDN island are prevented from capitalizing on existing digital facilities.

The present invention provides an apparatus and method for allowing a first subscriber to automatically determine whether digital operation is supported by a link to a second subscriber after establishing the link, and the highest data rate supported by the link. The present invention also provides a method and apparatus for allowing a subscriber on a BRI to originate 56 kbps or 64 kbps digital calls to, and receive calls from, other subscribers having such digital capability. Still further, the present invention allows a subscriber on an ISDN to originate a call to a subscriber who is capable of communication only by analog modulation schemes without placing a first call that will fail and then having to make a second call, and without knowing the capabilities of the subscriber prior to placing the call.

SUMMARY OF THE INVENTION

The present invention is a method and apparatus for automatically determining whether: (1) analog equipment is used at any point along a path or link formed to connect a call over a switched telephone network, (2) the link includes either digital signal processing equipment which alters digital samples in a non-restorable fashion or sample altering network facilities (such as robbed-bit signaling or zero code suppression facilities), and (3) the capabilities of an answering subscriber. In short, the present invention determines whether a sufficiently clear digital path exists from a first end user to a second end user when connecting a call over a switched telephone network. Once the determination is made, the type of connection that is possible (high speed digital or analog compatible rates) can be determined.

The present invention determines the characteristics of a path between two subscribers on a telephone network by transmitting a digital probe along the path. A modified version of training methods described in conventional modulation standards (such as V.32bis, and V.34 (soon to be standardized), established by the International Telecommunications Union—Telecommunication Standards Sector (ITU-TSS), formerly known as the International Telegraph and Telephone Consultative Committee (CCITT)) is preferably used to allow the present invention to remain fully compliant with such standards. Therefore, in cases in which an answering subscriber (the "answerer") or the intermediate path are incapable of supporting a digital call, communication in accordance with a standard analog modulation scheme can proceed without having to redial the call.

The present invention defines three signaling periods. The first signaling period is "DDL-A." During DDL-A, a digital probe is transmitted by the originating equipment (the "originator"). The probe comprises a predetermined pattern that is intended to distinguish a path that is sufficiently clear to support digital communication from a path that is not. If the path is sufficiently clear to support digital communication, then the probe is received by the answerer at the answering end of the call. Because the present invention preferably uses a modified standard modulation protocol, a standard response (such as a V.25 answer tone) is first provided by the answering equipment. Such a response causes signal conditioning equipment (such as echo cancellation equipment) to be disabled. Data patterns transmitted in accordance with the present invention ensure that echo cancellation equipment remains disabled.

If the answering equipment is capable of digital communication and detects a DDL-A probe, then the next signaling period, "DDL-B," begins. During DDL-B, the answering equipment indicates the capabilities of the answering digital equipment (such as the rate at which the answering equipment can operate). The originating equipment analyzes the response from the answering equipment and selects a set of parameters from among those offered by the answerer, in accordance with which the originating equipment and the answering equipment will communicate. Once the originating equipment receives the indication of the answering equipment's capabilities, the next signaling period, "DDL-C," begins with the originating equipment sending an indication of the selected parameters to the answering equipment. Upon receipt of the indication of the selected parameters by the answering equipment, the answering equipment preferably enters the next signaling period, "DDL-S1". During DDL-S1, the answerer transmits a succession of preferably scrambled samples, in which all bits prior to scrambling are preferably set to logical "1". The originator enters the DDL-S1 period a predetermined time after the beginning of the DDL-C period. In one alternative embodiment, the answerer may begin transmission of end user data immediately after receipt by the answerer of the indication of the selected parameters. The originator begins transmission of end user data a predetermined time after entering the DDL-C period. In another alternative embodiment, the answerer and originator enter the DDL-S1 period, as described above, however, the samples transmitted during the DDL-S1 period are not scrambled. Rather, the samples are transmitted with values that ensure that any signal conditioning equipment (such as echo cancellation equipment) will be disabled.

In accordance with the preferred embodiment, once the answerer receives and correctly unscrambles a predetermined number of samples, the answerer enters the next period, "DDL-DA", and begins sending end user digital information to the originator. Likewise, once the originator receives and correctly descrambles a predetermined number of samples, the originator enters the next period, "DDL-DO", and begins sending end user digital information to the answerer.

Scrambled samples that are transmitted during the DDL-S1, DDL-DA, and DDL-DO periods can be configured to allow transmission at equivalent data rates that are less than the native data rate of 64 kbps. When effective data rates of either 56 kbps or 64 kbps are selected, the present invention preferably encodes the scrambled samples to prevent zero code suppression circuitry along the path from altering the end user digital information. This is preferably accomplished by delaying transmission of the least significant end user digital information bit in a sample, if either all other bits in that sample are zero (in the case of 64 kbps transfer rate) or the 6 most significant bits in that sample are zero (in the case of 56 kbps transfer rate). This effectively causes a reframing of each subsequent sample. The least significant bit of the scrambled sample is then set to a logical "1" in the case of 64 kbps transfer rate.

When the answerer receives a sample, the data pattern of the sample received is checked. If the data pattern is "000000XX" and the transfer rate is 56 kbps, then only the most significant 6 bits are descrambled. If the data pattern is "0000000X" and the transfer rate is 64 kbps, then only the most significant 7 bits are descrambled.

If the answering equipment is not capable of digital communication, the answering equipment will not detect the digital probe transmitted during DDL-A. Also, if the path is not sufficiently clear to allow digital signals to be received with a tolerable bit error rate, then the probe not will survive the transmission. For example, the signal may traverse equipment which alters the digital pattern of the signal (such as analog equipment equalizers, compressors, expanders, limiters, and zero code suppression equipment). In either case, the answerer will respond in accordance with an analog modulation standard, and the negotiation and communication between the originator and the answerer will continue in accordance with the analog modulation standard. This process is accomplished in very nearly the same amount of time as would elapse if the originator attempted the call in accordance with a standard analog modulation scheme.

If the answering "equipment" is not capable of digital or modem data transmission (for example, if the call is to a voice number), the originator will not receive an appropriate response, and disconnects the call.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIGS. 2A–2B is a flowchart of the steps performed by equipment originating a digital call in accordance with the present invention.

FIG. 3 is a DDL-A data pattern in accordance with the preferred embodiment of the present invention.

FIG. 4A is an illustration of an ANSWERER CAPABILITY IDENTIFIER in accordance with the preferred embodiment of the present invention.

FIG. 6 is an illustration of the relationship between the transfer rate and the framing of the end user digital information to be transmitted.

FIG. 10 is a block diagram of exemplary hardware of one embodiment of the present invention.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

The present invention is a method and apparatus for automatically determining whether: (1) analog equipment is used at any point along a path or link formed to connect a call over a switched telephone network, (2) the link includes digital signal processing equipment which alters digital samples in a non-restorable fashion or sample altering network facilities (such as robbed-bit signaling or zero code suppression facilities), and (3) the capabilities of an answering subscriber. In short, the present invention determines whether a sufficiently clear digital path exists when connecting a call between a first subscriber and a second subscriber over a switched telephone network. The determination is made after the path has been established. By making this determination, a further determination can be made as to whether to proceed with the call using digital techniques or analog modulation techniques, and the rate at which equipment may communicate over the path.

The present invention involves transmitting a digital probe along the path that is established for a call between a first telephone endpoint (such as a first subscriber to the telephone system) and a second telephone endpoint (such as a second subscriber to the telephone system). In the preferred embodiment, the originator of the call is responsible for transmitting the probe. However, a probe in accordance with the present invention can be transmitted from either end (or both ends) of the path. In some circumstances, it may be advantageous to transmit a separate probe from both ends to verify that the path is sufficiently clear to allow digital communication with tolerable bit error rates in each direction (as is known, a duplex call requires two circuits, one in each direction, between two subscribers).

The present invention uses a modified version of the training methods of analog modulation schemes such as defined in V.32bis, or soon to be standardized V.34, both of which are specified by the International Telecommunications Union—Telecommunication Standards Sector (ITU-TSS), formerly known as the International Telegraph and Telephone Consultative Committee (CCITT). Therefore the probe can be used without interfering with any of the currently popular analog modulation schemes. If the probe is not recognized at the answering end of the path, an appropriate analog modulation scheme is used for communication between the originator and the answerer, if possible.

Operation of Originating Equipment

Figure 1:
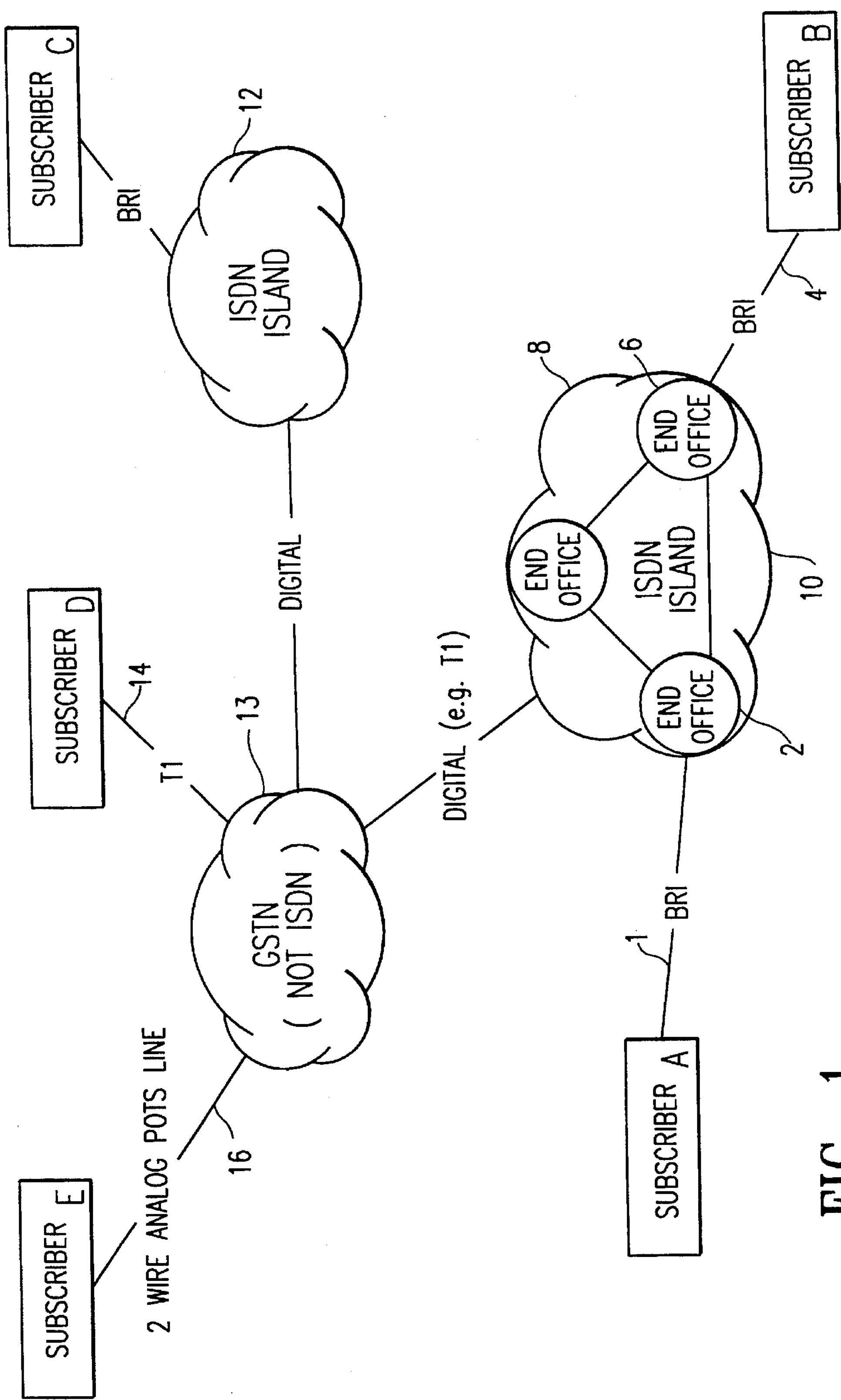
FIG. 1 is diagram of a prior art telecommunications network.
Figure 2B:
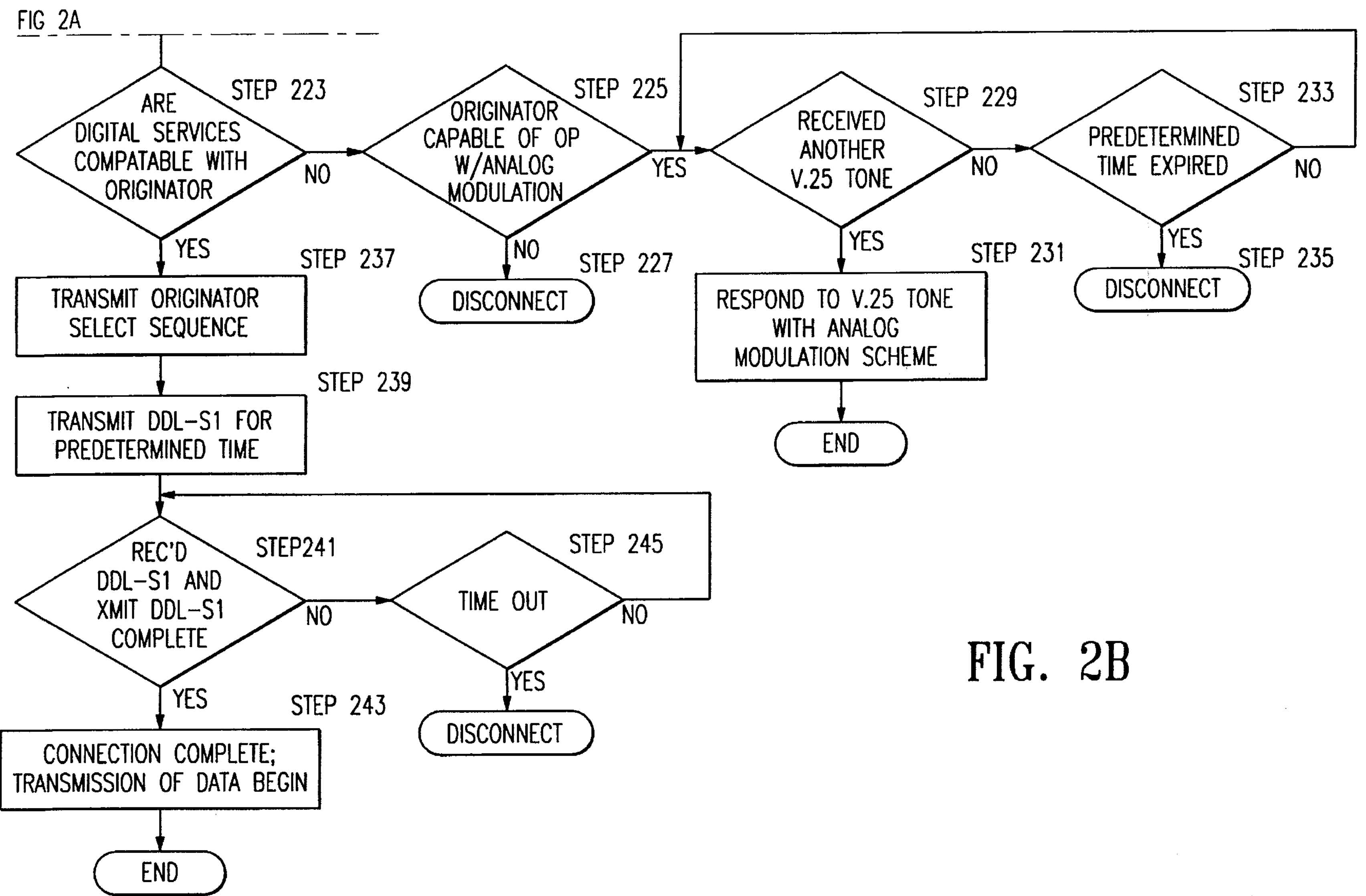

FIG. 2A–2B is a flowchart of the steps taken by an originator of a call in accordance with the preferred embodiment of the present invention. The originator includes an electronic system configured in accordance with the present invention, and coupled to a GSTN by a digital interface, such as a BRI or PRI. It should be noted that all signals between the originator and the central office are digital data streams. However, such data streams can represent true digital data, or analog signals encoded into digital form. In either case, 8-bit samples transmitted between the originator and the central office are referred to as "samples". One aspect of the present invention is the use of digital probes to distinguish the "native" form of incoming data.

The originator initiates a call by transferring addressing information from the originator to a telephone network, such as an integrated services digital network (ISDN) or a non-ISDN switch network connected through an end office (such as a local exchange office or an inter-exchange carrier) (STEP 201). In accordance with the preferred embodiment of the present invention, once call addressing is complete, the originator transmits an ORIGINATOR PROBE SEQUENCE comprising a predetermined data pattern (DDL-A) to the answerer during a first period, "DDL-A" (STEP 203).

The DDL-A probe data pattern of the preferred embodiment of the present invention is illustrated in FIG. 3 as a bit sequence. The bits are transmitted as a continuous cycle of 48 8-bit samples. The pattern that is illustrated in FIG. 3 shows 24 such 8-bit samples aligned according to the channel framing structure.

The least significant bit (labeled as "J" in FIG. 3) is "0" for the first 24 8-bit samples, and is "1" for the remaining 24 8-bit samples of the 48 sample DDL-A pattern. If a signaling technique, such as "robbed-bit signaling" is implemented on the path, then the least significant bit of each sample is unreliable. Robbed-bit signaling is a method by which the network embeds signaling information about the state of an interface into the audio path in place of the least significant bit of selected samples. If robbed-bit signaling is being implemented, then the least significant bit of at least one sample within 48 will be inverted. Therefore, if the answerer does not detect changes in the least significant bit at 24 sample intervals of the DDL-A pattern, or the answerer detects changes in the least significant bit at other than 24 sample intervals of the DDL-A pattern, it is understood that the full bandwidth is not available or is not being used. In accordance with the preferred embodiment, the least significant bit of the DDL-A pattern is forced to a logic "0" state in each of the 48 samples of the pattern when the transfer rate at which end user digital information is to be transmitted is less than the native rate (e.g., 64 kbps). By forcing the least significant bit to remain in the same state for all samples, answering equipment will not detect 64 kbps capability. However, it should be understood that other patterns in which the least significant bit does not behave in the required manner (i.e., alternate from a first logic state to a second logic state at regular intervals in the illustrated embodiment) could be used to indicate that the native rate is not available.

In accordance with the preferred embodiment of the present invention, the most significant bit of the DDL-A pattern alternates between "0" and "1" each sample. Each of the bits between the most significant bit and the least significant bit are in a logic "1" state. Because the most significant bit is the only bit that alternates between a first and second logic state and each of the other bits are "1" except for the least significant bit, the illustrated DDL-A pattern does not to generate audible noise over the network path regardless of whether the answering equipment is digital or analog. Digital answering equipment will not detect the illustrated pattern as audible energy. Therefore, if a person answers the call, no disturbing tone will be heard. Also, since the illustrated pattern does not generate energy that is detectable by answering equipment that is incapable of detecting digital patterns, the present invention will not interfere with most popular analog modulation schemes.

Concurrent with transmitting the DDL-A pattern, the originator monitors signals received from the network path for an indication (such as a V.25 answer tone, the well known T.30 CED tone, or a 2125 Hz sine wave) that the answerer has made connection. In the preferred embodiment, a V.25 answer tone is transmitted by the answerer which is compliant with the requirements specified by CCITT standards, such as V.32 (STEP 205). If a V.25 compliant tone is not received within a user-defined period of time (e.g., 30–60 seconds) (STEP 207), then the originator disconnects the call (STEP 209). This may occur, for example, if the originator has called a voice number or has a poor connection. In an alternative embodiment, the originator may take additional action, such as redialing the call and repeating the process.

If a V.25 compliant tone is received within the user-defined period of time, then a timer starts to run (STEP 211). In the preferred embodiment, the timer runs for approximately 1.5 seconds. The originator monitors the incoming data for a responsive digital probe. In accordance with the preferred embodiment of the present invention, the responsive digital probe takes the form of a complete "DDL-B" data pattern (STEP 213). A complete DDL-B data pattern preferably includes three parts, an ANSWERER CAPABILITY IDENTIFIER, an ANSWERER CAPABILITY MESSAGE, and a HIGH RATE PROBE.

FIG. 4A is an illustration of a portion of the ANSWERER CAPABILITY IDENTIFIER in accordance with the preferred embodiment of the present invention. This pattern allows the originator to identify the ANSWERER CAPABILITY MESSAGE transmitted from the answerer. The originator preferably must identify the data pattern shown in FIG. 4A 12 consecutive times (i.e., a total of 48 consecutive 8-bit samples). Preferably, the three most significant bits 401 of each of the 48 8-bit samples are relevant to the ANSWERER CAPABILITY IDENTIFIER. It should be understood that the data pattern shown is provided only as an example. Any predefined data pattern may serve the purpose of the ANSWERER CAPABILITY IDENTIFIER of the DDL-B data pattern. However, the pattern should preferably produce enough measurable audible energy (when viewed as digitized analog samples) to keep signal processing equipment (such as echo cancelers or echo suppressors) disabled.

Figure 4B:
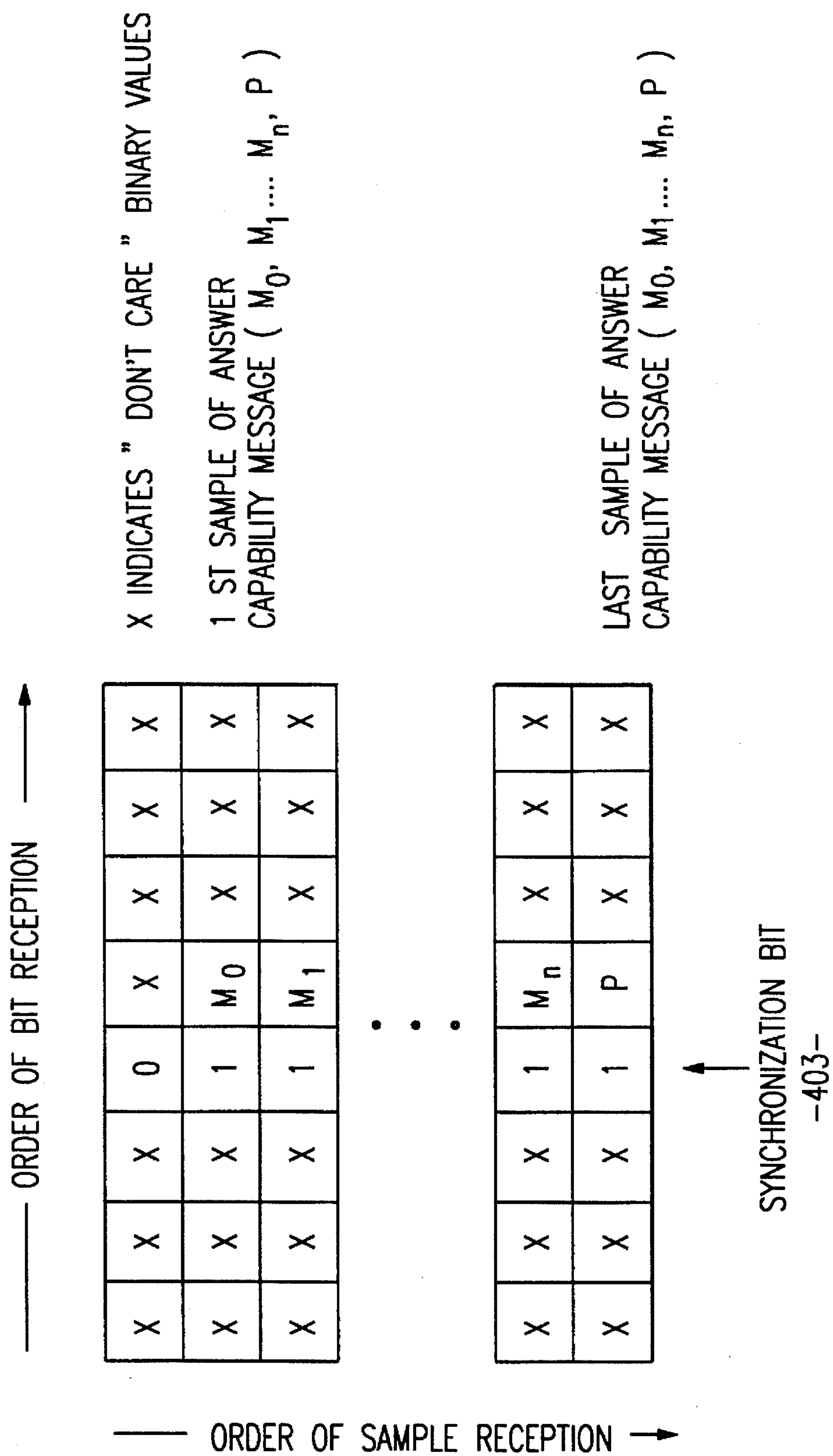
FIG. 4B is an illustration of an ANSWERER CAPABILITY MESSAGE in accordance with the preferred embodiment of the present invention.

FIG. 4B illustrates a portion of the second part of the DDL-B data pattern in accordance with the preferred embodiment of the present invention. The second part of the DDL-B data pattern communicates the capabilities of the answerer. The length of the second part of the DDL-B data pattern depends upon the number of capabilities possessed by the answerer. As shown in FIG. 4B, the second part of the DDL-B data pattern includes the fourth and fifth most significant bits of a series of 8-bit samples. The fourth most significant bit 403 of each sample which is part of the ANSWERER CAPABILITY MESSAGE is preferably used as a synchronization bit. In the preferred embodiment of the present invention, the beginning boundary of the ANSWER CAPABILITY MESSAGE is indicated by a transition in the synchronization bit from a "0" to a "1" logic state. The fourth most significant bit 403 of the ANSWERER CAPABILITY MESSAGE may remain in the "0" logic state during transmission of an undetermined number of samples, provided that the remainder of the pattern is transmitted within the required amount of time. The ending boundary of the message is indicated by a transition in the synchronization bit from a "1" to a "0" logic state. In accordance with the preferred embodiment of the present invention, the fifth bit (labeled "$M_n$") of each sample which is part of the ANSWERER CAPABILITY MESSAGE indicates whether the answerer has a particular capability, such as data transfer rates at which the answerer is capable of operating. For example, in the preferred embodiment of the present invention, each bit indicates a transfer rate or layer 2 type as illustrated in TABLE 1.

TABLE 1

| | |
|---|---|
| $M_0$ = | 64 kbps available/selected |
| $M_1$ = | 56 kbps available/selected |
| $M_2$ = | 48 kbps available/selected |
| $M_3$ = | 40 kbps available/selected |
| $M_4$ = | 32 kbps available/selected |
| $M_5$ = | 24 kbps available/selected |
| $M_6$ = | 16 kbps available/selected |
| $M_7$ = | 8 kbps available/selected |
| $M_8$ = | LAPM available/selected |
| $M_9$ = | V.120 available/selected |
| $M_{10}$ = | V.14, excluding overspeed available/selected |
| $M_{11}$ = | raw bit synchronous mode available/selected |

The fifth bit of the sample transmitted after the transmission of $M_n$ is a longitudinal parity bit (labeled "P" in FIG. 4B). The longitudinal parity bit equals the sum of the bits in the same position of each of the preceding samples beginning at the time the synchronization bit transitions from a logic "0" to logic "1". Alternatively, the state of the longitudinal parity bit could be the inverse of this sum. If the longitudinal parity bit is in an incorrect state, then a bit error has occurred and that error can be detected.

Figure 4C:
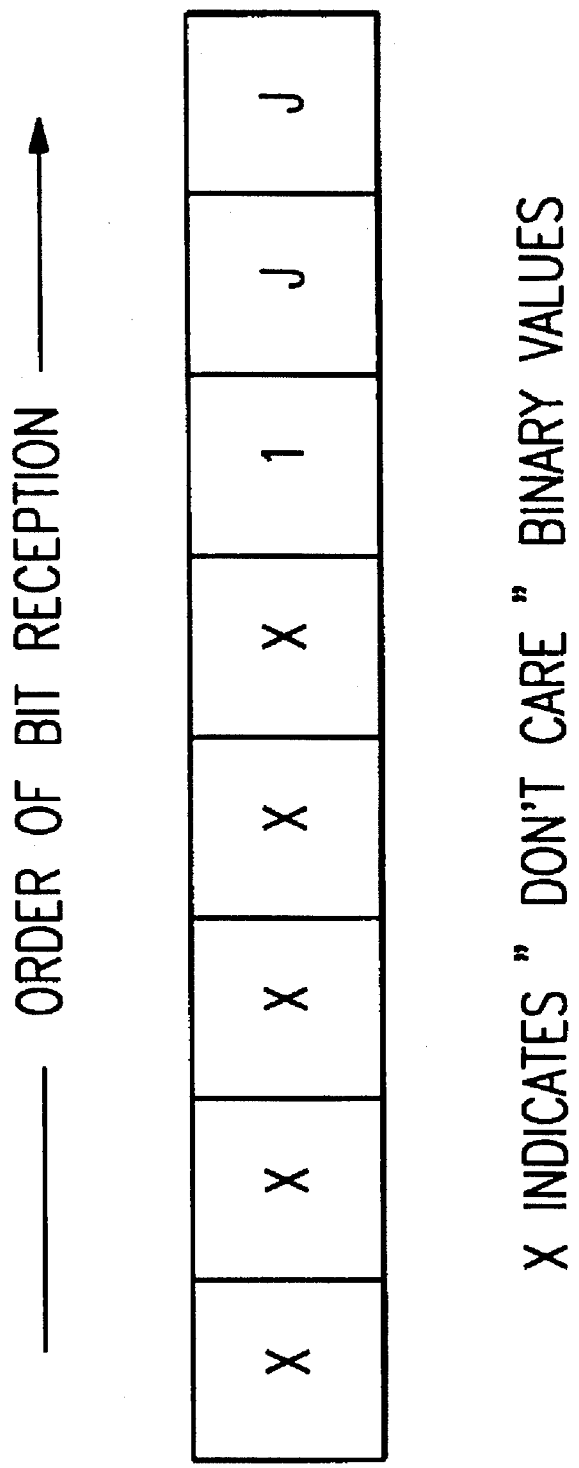
FIG. 4C is an illustration of a HIGH RATE PROBE of the DDL-B data pattern in accordance with the preferred embodiment of the present invention.

FIG. 4C is an illustration of the HIGH RATE PROBE of the DDL-B data pattern in accordance with the preferred embodiment of the present invention. The illustrated HIGH RATE PROBE comprises the three least significant bits of 48 consecutive 8-bit samples transmitted from the answerer. In accordance with the preferred embodiment of the present invention, the state of the two least significant bits remain in one state for 24 occurrences of the sample and then are inverted for the next 24 occurrences. The state of the two least significant bits within any one sample are logically equal to one another. If the originator receives a HIGH RATE PROBE having the designated pattern, then both the answerer and the path between the originator and the answerer are capable of supporting a high data transfer rate, such as 64 kbps. However, if the two least significant bits are not in the same logical state for at least 48 consecutive 8-bit samples, then 64 kbps operation is not supported. Thus, the answerer can indicate that 64 kbps operation is not available by either setting the $M_0$ bit to logical zero, or causing the two least significant bits to be the logical inverse of one another. The HIGH RATE PROBE of the DDL-B data pattern verifies the ability of the path between the answerer and the originator to transfer end user information at the native rate of 64 kbps using the same principle (i.e., detecting alterations in the least significant bits) as is used by the DDL-A data pattern transmitted by the originator. That is, by maintaining the state of the two least significant bits in the same state for at least 48 consecutive 8-bit samples, the present invention can detect alterations of the least significant bit, such as inversions to the least significant bit caused by robbed-bit signaling. The subjective effect of robbed-bit signaling is "noise" to the human listener or to attached analog equipment. Because the least significant bit cannot be recovered once altered, the least significant bit is usually unreliable in a GSTN where robbed bit signaling is present. Due to the method of robbed-bit signaling insertion, the least significant bit will become altered at some point within 48 samples received at the originating equipment. Therefore, the ANSWERER HIGH RATE PROBE will be received with alteration, rendering it "undetectable". In contrast, in an ISDN the signaling path is separate from the data or voice path. In an ISDN, no random altering of the least significant bit occurs. Therefore, the ANSWERER HIGH RATE PROBE will be receivable by the originator without alteration (i.e., the probe will be "detectable"). In accordance with the present invention, the ANSWERER CAPABILITY IDENTIFIER is within the same 8-bit samples that contain the HIGH RATE PROBE in order to identify the HIGH RATE PROBE. Alternatively, the ANSWERER CAPABILITY IDENTIFIER may be present in 8-bit samples that are transmitted before the HIGH RATE PROBE is transmitted.

It is possible that a path between a first and a second end user may include zero code suppression equipment. If zero code suppression equipment is present in the path, then 8-bit samples in which all bits are zero are altered. Zero code suppression equipment typically inverts the 7th most significant bit of an 8-bit sample in which all 8 bits are zero. In order to ensure that the seventh bit of the high rate probe is not altered, the sixth most significant bit in the high rate probe is always set to a logical "1". Thus, the bits of a sample that includes a HIGH RATE PROBE will never all equal zero. This prevents zero code suppression equipment from altering the 7th most significant bit.

In the preferred embodiment of the present invention, each of the parts of the DDL-B data pattern are assigned to non-overlapping bits of 8-bit samples. Therefore, each of the parts of the DDL-B data pattern are preferably transmitted by the same sequence of 48 8-bit samples. This 48 sample sequence is repeated throughout the DDL-B period. Network events, commonly referred to as "slips", may occasionally occur. Such slips are not easily detectable in the ANSWERER CAPABILITY MESSAGE part of the DDL-B pattern, but are easily detected in the ANSWERER CAPABILITY IDENTIFIER part of the DDL-B pattern. Therefore, better error detection inside the ANSWERER CAPABILITY MESSAGE can be obtained if the ANSWERER CAPABILITY IDENTIFIER and the ANSWERER CAPABILITY MESSAGE are transmitted in the same sequence of 48 8-bit samples.

If the timer times out before a complete DDL-B sequence is detected (STEP 215), and the originator is capable of operation with analog modulation schemes (STEP 217), then the originator responds to the V.25 tone in accordance with the appropriate analog modulation scheme (STEP 219). If the timer times out and the originator is not capable of operation with an analog modulation scheme, then the originator preferably disconnects the call (STEP 221).

If a complete DDL-B data pattern has been detected before the timer times out, then the originator verifies that the digital services available from the answering equipment are compatible with the originating equipment (STEP 223). If the services available from the answerer are not compatible with the originating equipment, and the originating equipment is not capable of operation with analog modulation schemes (STEP 225), then the originator disconnects the call (STEP 227). If the services available from the answerer are not compatible with the originating equipment, but the originating equipment is capable of operating with analog modulation schemes (STEP 225), then the originating equipment awaits receipt of another V.25 tone (STEP 229). If another V.25 tone is received, then the originator responds to the V.25 tone in accordance with a standard analog modulation scheme (STEP 231). Data is then transmitted using the analog modulation scheme. If a V.25 tone is not received within a predetermined amount of time (STEP 233), then the originator disconnects the call (STEP 235).

Figure 5:
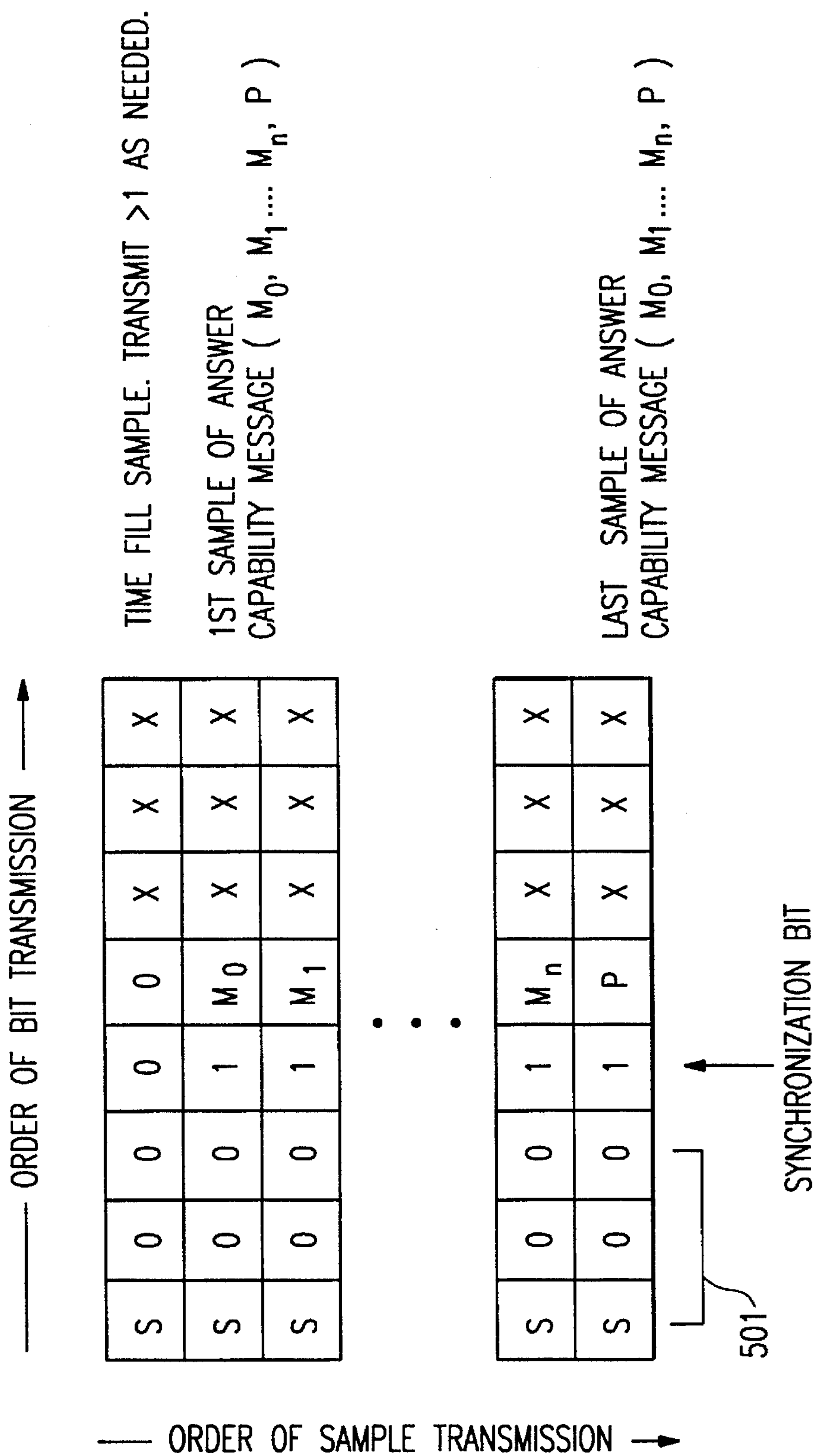
FIG. 5 is an illustration of an ORIGINATOR SELECT MESSAGE in accordance with the preferred embodiment of the present invention.

Returning to STEP 223, if the digital services of the originator and the answerer are compatible, then the originator transmits an ORIGINATOR SELECT IDENTIFIER and ORIGINATOR SELECT MESSAGE (STEP 237) during a DDL-C period. FIG. 5 is an illustration of the data pattern transmitted during the DDL-C period in accordance with the preferred embodiment of the present invention. The first three most significant bits of the data pattern shown in FIG. 5 comprise the ORIGINATOR SELECT IDENTIFIER 501. The bit labeled "S" is generated to be in a first logical state for two consecutive 8-bit samples, and then in the inverse logical state for the next two 8-bit samples. This pattern is repeated throughout the DDL-C period and allows the answerer to identify the DDL-C period. The fourth most significant bit of the data pattern transmitted during the DDL-C period provides synchronization in the same manner as described above in the context of the data pattern transmitted during DDL-B shown in FIG. 4B. The fifth most significant bit comprises the ORIGINATOR SELECT MESSAGE. The ORIGINATOR SELECT MESSAGE is essentially the same as the ANSWERER CAPABILITY MESSAGE shown in FIG. 4B. That is, each consecutive 8-bit sample, starting from the 8-bit sample in which the synchronization bit changes from "0" to "1", indicates a selected bit rate or layer 2 type. In the preferred embodiment of the present invention, the ORIGINATOR SELECT MESSAGE indicates the bit rate and the layer 2 type in accordance with TABLE 1, shown above. A parity bit "P" is preferably used in the same manner as described in the context of the ANSWERER CAPABILITY MESSAGE. Preferably, the originating equipment should not transmit an ORIGINATOR SELECT MESSAGE which indicates a transfer rate that was not indicated by the ANSWERER CAPABILITY MESSAGE. If more than one bit in the group $M_0$–$M_7$ is set to a logical "1", then it is mutually understood by the originator and answerer that both the originator and answerer will use the highest transfer rate indicated by the originator. For example, if $M_0$–$M_7$ are 0, 1, 0, 1, 1, 0, 0, and 0, respectively, then the selected transfer rate is 56 kbps.

Similarly, if more than one bit of the group $M_8$–$M_{11}$ is set to a logical "1", then it is mutually understood by the answering equipment and the originating equipment that the answering equipment and the originating equipment will use as the next higher layer protocol, the protocol indicated by the first bit set to a logical "1" from among the bits $M_8$–$M_{11}$. For example, if $M_8$–$M_{11}$ are 1, 0, 1, and 0, respectively, then LAPM is selected as the next high layer protocol. In accordance with the one embodiment of the present invention, if all bits $M_0$–$M_7$ or $M_8$–$M_{11}$ are zero, then the answerer and originator equipment are incompatible.

A predetermined time (12.5 ms, or the time required to transmit 100 samples, in the preferred embodiment) after the originator begins transmitting the ORIGINATOR SELECT IDENTIFIER and the ORIGINATOR SELECT MESSAGE, the originator preferably begins transmitting a "DDL-S1" pattern (STEP 239). The DDL-S1 pattern acts as a "sanity check" to verify that end user information will survive transmission over the call path. The DDL-S1 pattern is preferably generated by applying a stream of 8-bit samples, having each of the 8 bits set to a logic state "1", to a scrambler circuit (such as defined in CCITT V.22bis). In one embodiment, the scrambler may be a well known circuit that performs modulo-2 division of the transmit data stream by a fixed polynomial. Samples that are transmitted to the GSTN are scrambled in order to keep signal processing equipment, such as an echo canceler, disabled during the call.

Keeping signal processing equipment disabled requires a minimum amount of audible energy to be present in the call path. More specifically, the 8-bit samples, when interpreted as audio samples, must represent audible energy with a root mean square (RMS) energy which conforms to the holding-band characteristics specified in standards, such as CCITT G.164 and G.165. For standard analog modulation schemes (e.g., V.32bis), this requirement is easily met by producing a carrier signal with sufficient amplitude. When transmitting digital data samples over the same call path, however, the data itself determines the spectral content of the signal. Some commonly used data patterns can appear to contain no audible energy. For example, a data stream in which consecutive bits are at a logic state "1" for an extended period of time will appear to have no audible energy. By encoding the information with a scrambler, the scrambled (pseudo-random) stream of samples will have predictable spectral characteristics similar to band-limited white noise. The resulting stream of samples has sufficient audible energy to keep signal processing equipment which conforms to standards, such as CCITT G.164 and G.165, disabled.

In one alternative embodiment, no scrambler is required. In such an embodiment, the DDL-S1 pattern is designed such that sufficient audible energy will be detected to ensure that signal conditioning equipment (such as echo cancellation equipment) is disabled. In another alternative embodiment, the originator begins transmitting samples encoded with end user information after the predetermined period.

In accordance with one embodiment, a timer in the originator is started when the originator begins transmitting the DDL-S1 pattern. The originator transmits the DDL-S1 pattern at the negotiated rate for up to a predetermined period of time (such as 1–5 secs.). If the originator has received the required number of scrambled "1"s before the predetermined period of time has elapsed (STEP 241), then the originator begins transmitting end user digital information at the negotiated rate with each sample being scrambled (STEP 243).

If the originator does not received the required number of samples (such as 100 scrambled "1s") conforming to the DDL-S1 data pattern in the predetermined amount of time (STEP 245), then the originator disconnects the call. Alternatively, the originator may attempt to negotiate a standard analog modulation scheme by waiting for a V.25 tone, after which the originator can respond according to standardized analog modulation schemes.

In another embodiment, the DDL-S1 pattern is transmitted for a predetermined amount of time regardless of the values of samples that are received. This embodiment has the advantage of ensuring that both the answerer and the originator receive a number of samples sufficient to satisfy both the answerer and the originator. However, the requirement that the DDL-S1 period last a predetermined time, increases the time required to establish the call.

The native speed of a call path is 64 kbps. In accordance with one embodiment of the present invention, the manner in which the data is framed within a sample to be transmitted is dependent upon the transfer rate negotiated between the originator and the answerer. The transfer rate may, for example, be reduced to ensure that buffers at one end of the path or the other do not overflow. FIG. 6 illustrates the relationship between the transfer rate and the framing of the end user digital information to be transmitted. Each bit labeled "D" within an 8-bit sample shown in FIG. 6 carries (i.e., is encoded with) end user digital information. Bit positions denoted by an "X" in FIG. 6 may be in either logical state "0" or "1". In samples transmitted at the rate of 8 kbps, the second and third most significant bits of each sample are set to logical "0" to ensure that there is sufficient audible energy transmitted to keep network signal processing equipment disabled. This is necessary, since the only bit that carries end user information during 8 kbps operation is the most significant bit of each sample. Signal processing equipment decodes the most significant bit of each sample as a sign bit. Therefore, if the most significant bit is the only bit that is controlled, it is possible that insufficient audible energy will be detected by the signal processing equipment. This mapping of the end user information into the samples to be transmitted allows easy transmission of other rates and also maintains suitable audible energy to keep network signal processing equipment disabled.

In the preferred embodiment of the present invention, an additional encoding step is required when end user digital information is transferred at transfer rates of either 56 kbps or 64 kbps. This additional step is required in order to ensure that equipment along the call path that uses zero code suppression logic does not alter data bits of the end user digital information. Equipment that uses zero code suppression logic alters any sample with all zeros ("00000000") by inverting the second least significant bit (i.e., "00000010"). Therefore, if the framing suggested in FIG. 6 were used for every sample, some samples would be irreversibly altered. For example, if the first 7 bits (which represent the end user digital information) were all zero, and robbed-bit signaling were used, then each bit of the sample may have a value of "0" at some point along the path. Therefore, zero code suppression logic encountered after the signaling bit were set to "0" would cause the second least significant bit to be set to "1".

To prevent this from occurring during 56 kbps operation, the preferred embodiment of the present invention detects when a sample (end user data that has been scrambled) has a value of "000000DX", where "X" may be either logical "1" or "0", and "D" is a scrambled bit of end user digital information. When this data pattern is detected in the preferred embodiment of the present invention, the D data bit is delayed from transmission until the following sample. The D data bit is then transmitted as the most significant bit of the following sample. Each bit of the following sample is delayed by one bit, thus skewing the framing of each subsequent sample by one bit. Data that is received is processed by an inverse procedure. For example, if the sample received has a value of "00000XX", then only the 6 most significant bits are descrambled. If any other value is received, then the 7 most significant bits are descrambled. This encoding method results in transmission of end user digital transfer rate which is approximately 0.2% less than the negotiated 56 kbps rate.

When the negotiated transfer rate is 64 kbps, a similar method is used. The present invention detects when the sample to be transmitted is "000000D". The preferred embodiment of the present invention replaces the least significant bit with a logical value of "1" and delays the value of the least significant bit to the most significant bit of the next sample. Each subsequent bit is delayed to the next least significant position. When the answerer receives a sample, the data pattern of the sample received is checked. If the data pattern is "000000X", then only the most significant 7 bits are descrambled. Otherwise, all 8 bits are descrambled.

Transmission of the DDL-S1 data pattern verifies that the negotiated transfer rate was interpreted without error by both the originating and answering equipment. The scrambling circuit ensures transmission of a data stream having a predictable spectral characteristic similar to band-limited white noise. Therefore, the minimum audio energy required to keep echo suppressors disabled is continuously being transmitted.

Operation of Digital Answering Equipment

The operation of digital answering equipment in accordance with the preferred embodiment of the present invention conforms to the operation of originating equipment as described above, since such answering equipment is intended to be responsive to the originator.

Figure 7A:
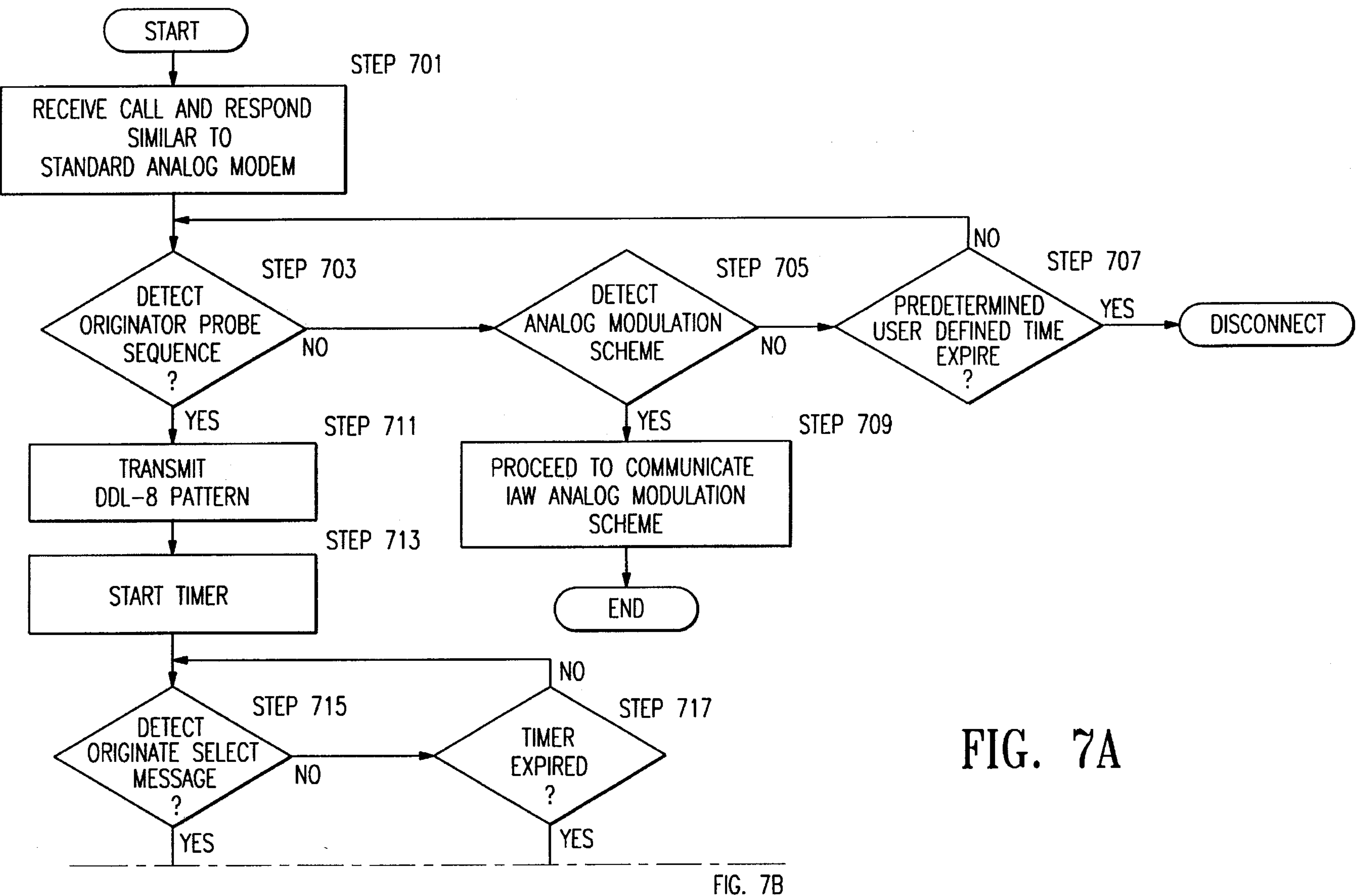
FIGS. 7A–7B is a flowchart of the steps taken by an answerer in accordance with the present invention.
Figure 7B:
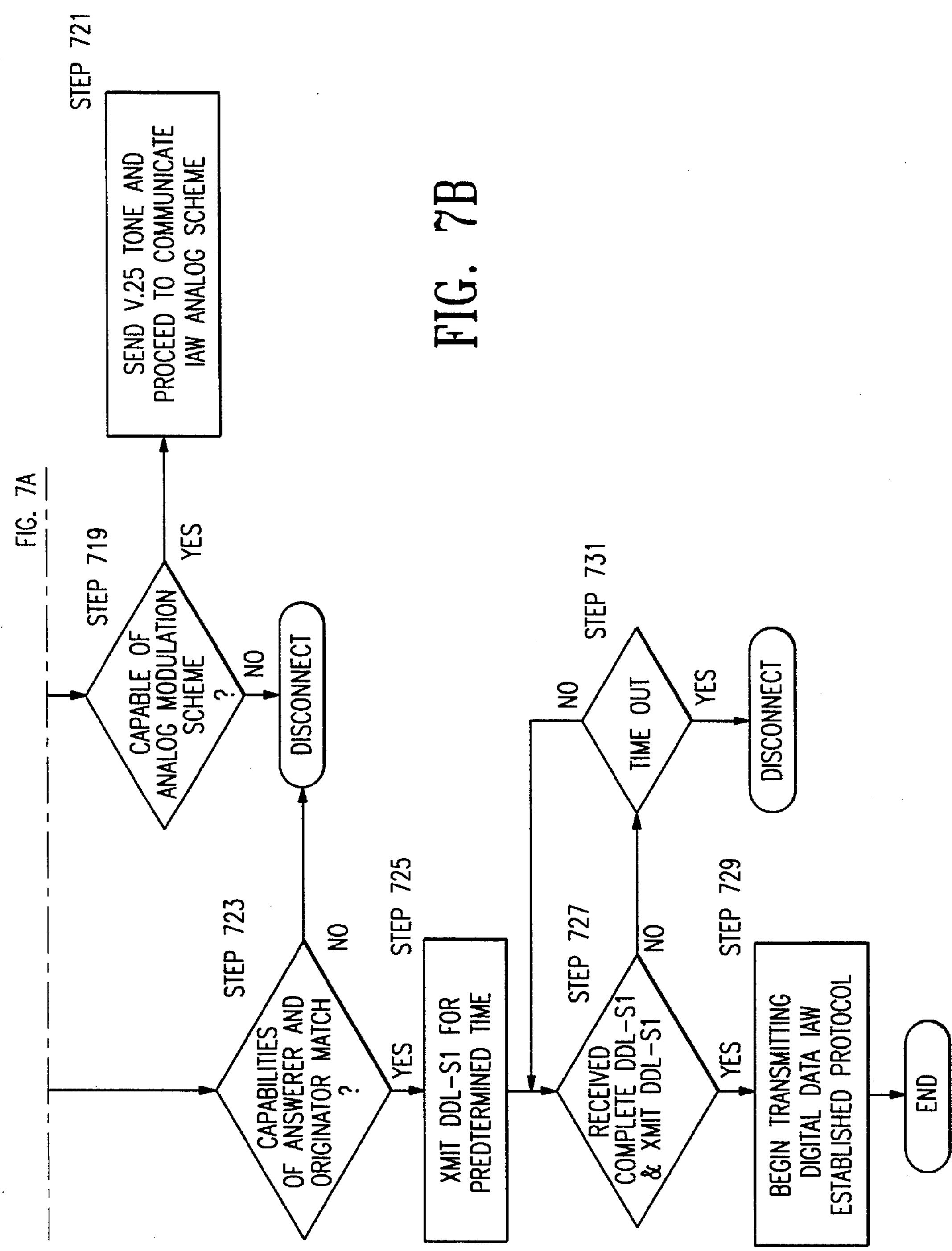
Figure 8:
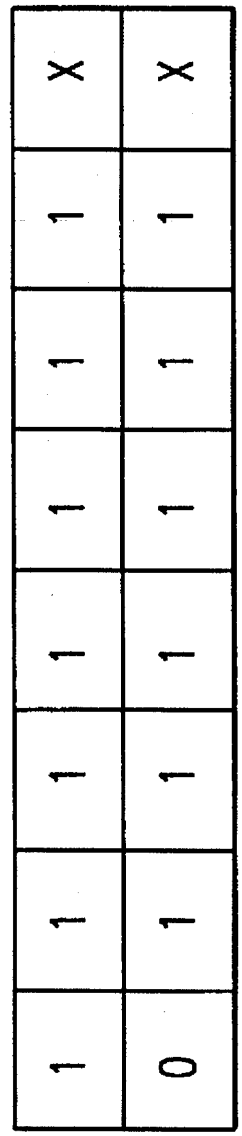
FIG. 8 is an illustration of an ORIGINATOR PROBE SEQUENCE as detected in accordance with the preferred embodiment of the present invention.

FIGS. 7A–7B is a flowchart of the steps taken by an answerer in accordance with the present invention. Initially, a digital answerer in accordance with the preferred embodiment of the present invention receives a call and responds to the call as would a standard modem; by transmitting a V.25 answer tone with phase reversals, in accordance with the V.25 CCITT specification, followed by transmission of standard analog modulation probes (STEP 701). Transmission of the V.25 answer tone causes signal processing equipment (such as echo cancelers, echo suppressors, etc.) on the path to disengage. In most cases, it is necessary to disengage signal processing equipment before digital data can be effectively transmitted, to prevent distortion of the digital data. Concurrently, the answerer monitors the received signal for an ORIGINATOR PROBE SEQUENCE (STEP 703) or signals in accordance with a standard analog modulation scheme (STEP 705). FIG. 8 is an illustration of a portion of the ORIGINATOR PROBE SEQUENCE in accordance with the preferred embodiment of the present invention. In accordance with the preferred embodiment of the present invention, an ORIGINATOR PROBE SEQUENCE is detected if the answerer detects the predefined data pattern illustrated in FIG. 8 repeated 24 times. Therefore, if the originator sends a data pattern such as illustrated in FIG. 3 repeatedly, the answerer recognizes the pattern illustrated in FIG. 8. If the answerer does not detect either an ORIGINATOR PROBE SEQUENCE or signals in accordance with a recognized analog modulation scheme within a predetermined amount of time (STEP 707), then the answerer disconnects the call.

If the answerer is not a digital system configured in accordance with the present invention, but can detect and respond to signals consistent with a recognized analog modulation scheme, then the answerer will not detect the ORIGINATOR PROBE SEQUENCE and will proceed to communicate in accordance with the analog modulation scheme (STEP 709).

If the answerer successfully detects an ORIGINATOR PROBE SEQUENCE and a V.25 tone has been transmitted by the answerer for at least one second, the answerer enters a SELECT WAIT PHASE during which the answerer transmits a DDL-B data pattern (STEP 711), as illustrated in FIGS. 4A, 4B, and 4C, and described above. In the preferred embodiment, the V.25 tone is transmitted for a minimum of one second to ensure that echo cancelers operating in accordance with CCITT G.165 standard have been disabled, as is required to provide a clear channel for digital transmission having acceptable bit error rates. The answerer indicates its capabilities within the ANSWERER CAPABILITY MESSAGE part of the DDL-B data pattern. Also during the SELECT WAIT PHASE, the answerer starts a timer (STEP 713) and monitors the incoming data to detect an ORIGINATOR SELECT MESSAGE (STEP 715).

In accordance with the preferred embodiment of the present invention, if the timer expires (preferably after 1 sec.) before the answerer detects receipt of an ORIGINATOR SELECT MESSAGE (STEP 717), and the answerer is not capable of communicating in accordance with an analog modulation scheme (STEP 719), then the answerer disconnects the call. If the timer expires before the answerer detects receipt of an ORIGINATOR SELECT MESSAGE, and the answerer is capable of communicating in accordance with an analog modulation scheme, then the answerer transmits another V.25 tone (STEP 721).

Alternatively, if the answerer detects an ORIGINATOR SELECT MESSAGE, the answerer verifies that the capabilities selected by the originator, as indicated in the ORIGINATOR SELECT MESSAGE, are compatible with the capabilities of the answerer (STEP 723). In accordance with the preferred embodiment of the present invention, if the ORIGINATOR SELECT MESSAGE has fewer 8-bit samples than were transmitted by the answerer in the ANSWERER CAPABILITY MESSAGE (but includes at least 13 8-bit samples), than the answerer assumes that capabilities associated with the missing 8-bit samples are not selected.

In the preferred embodiment, if the originator has selected capabilities that are not available to the answerer, then a violation of the protocol has occurred, and the answerer disconnects the call. In an alternative embodiment, attempts to renegotiate the capabilities may be possible. For example, in one such alternative embodiment, the answerer may attempt to complete the call in accordance with standard analog modulation techniques.

If the capabilities of the originator and answerer have been successfully established, and the originator has selected capabilities which are within the capabilities of the answering equipment, the answering equipment indicates this to the next higher layer processing entity of the answering equipment. The answerer then starts a timer and begins transmitting a DDL-S1 data pattern that is essentially identical to the DDL-S1 data pattern transmitted by the originator, as described above (STEP 725). As described above in the context of the originator, in one embodiment of the present invention the answerer transmits the DDL-S1 pattern for up to a predetermined amount of time. If the answerer has transmitted the DDL-S1 pattern for up to the predetermined amount of time (which in the preferred embodiment is approximately 1 sec.), and the required number of logical "1"s have been received (preferably 100) (STEP 727), then the connection is complete and end user digital data is transmitted by the answerer to the originator (STEP 729).

If a user-defined predetermined amount of time expires without receipt by the answerer of the required number of DDL-S1 samples (STEP 731), then the call is disconnected. Alternatively, the answerer may attempt to negotiate a standard analog modulation scheme by transmitting another V.25 answer tone. In such an embodiment, the answerer must not attempt to detect the DDL-A pattern. Otherwise, the answerer and originator may become trapped in a loop in which no end user digital information is transmitted.

In accordance with one embodiment of the present invention, once the DDL-S1 pattern has been transmitted for up to the predetermined amount of time and the required number of DDL-S1 samples have been received, end user digital information is provided at the mutually agreed rate to the next higher layer processing entity of the answering equipment. This higher layer may begin to transmit and receive data over the digital link now established between the originator and the answerer. (STEP 725). In an alternative embodiment of the present invention, once the answerer receives the required number of bits in the expected logic state, the answerer begins transmitting samples encoded with end user information without waiting for the timer to expire.

It should be understood that analog answerer equipment (e.g., modems) will respond to an originator in accordance with the present invention without modification to such equipment. Answerer equipment which is not capable of supporting standard analog modulation techniques must be modified in accordance with the present invention in order to be able to communicate with an originator operating in accordance with the present invention.

Timing Diagram of the Present Invention

Figure 9A:
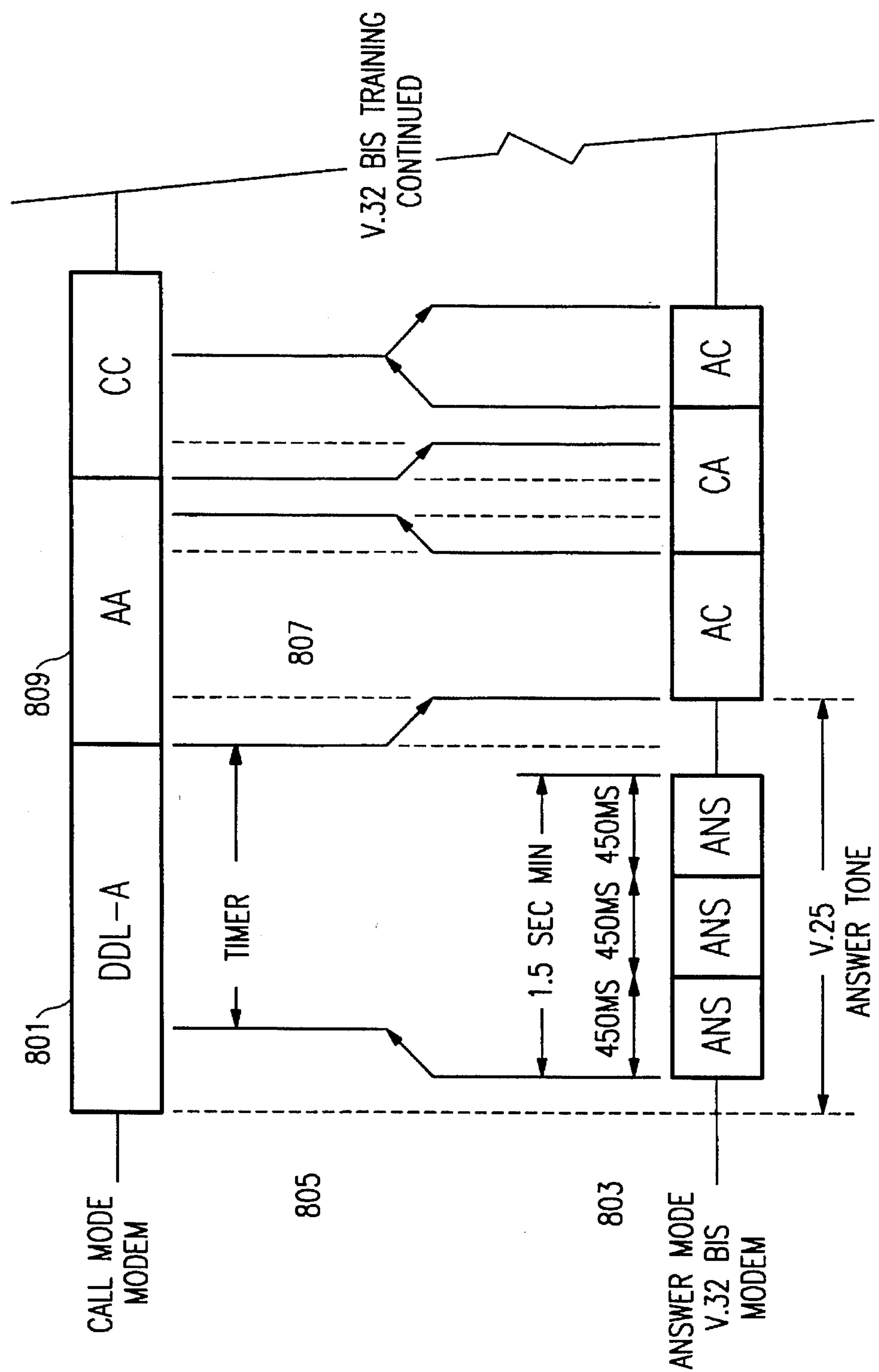
FIG. 9A is a timing diagram of the present invention for the case in which the answerer or the link is not capable of supporting digital communication.

FIG. 9A is a timing diagram of the present invention in the case in which the answerer or the link is not capable of supporting digital communication. As described above, an originator first transmits a DDL-A message 801. If the answerer is incapable of detecting or responding to the DDL-A message, the answerer answers the call in accordance with a standard CCITT analog modulation scheme, such as V.32bis. Thus, the answerer transmits a V.25 answer tone with phase inversions 803. After the transmission delay of the network, the originator responds to receipt of the V.25 tone by starting a timer at time 805. In the case shown in FIG. 9A, the answerer (or the intermediate path) is not capable of digital communication, thus the timer times out at time 807. When the timer times out, the originator transmits a response 809 to the V.25 tone, and the process proceeds in accordance with a standard CCITT analog modulation scheme such as V.32bis.

Figure 9B:
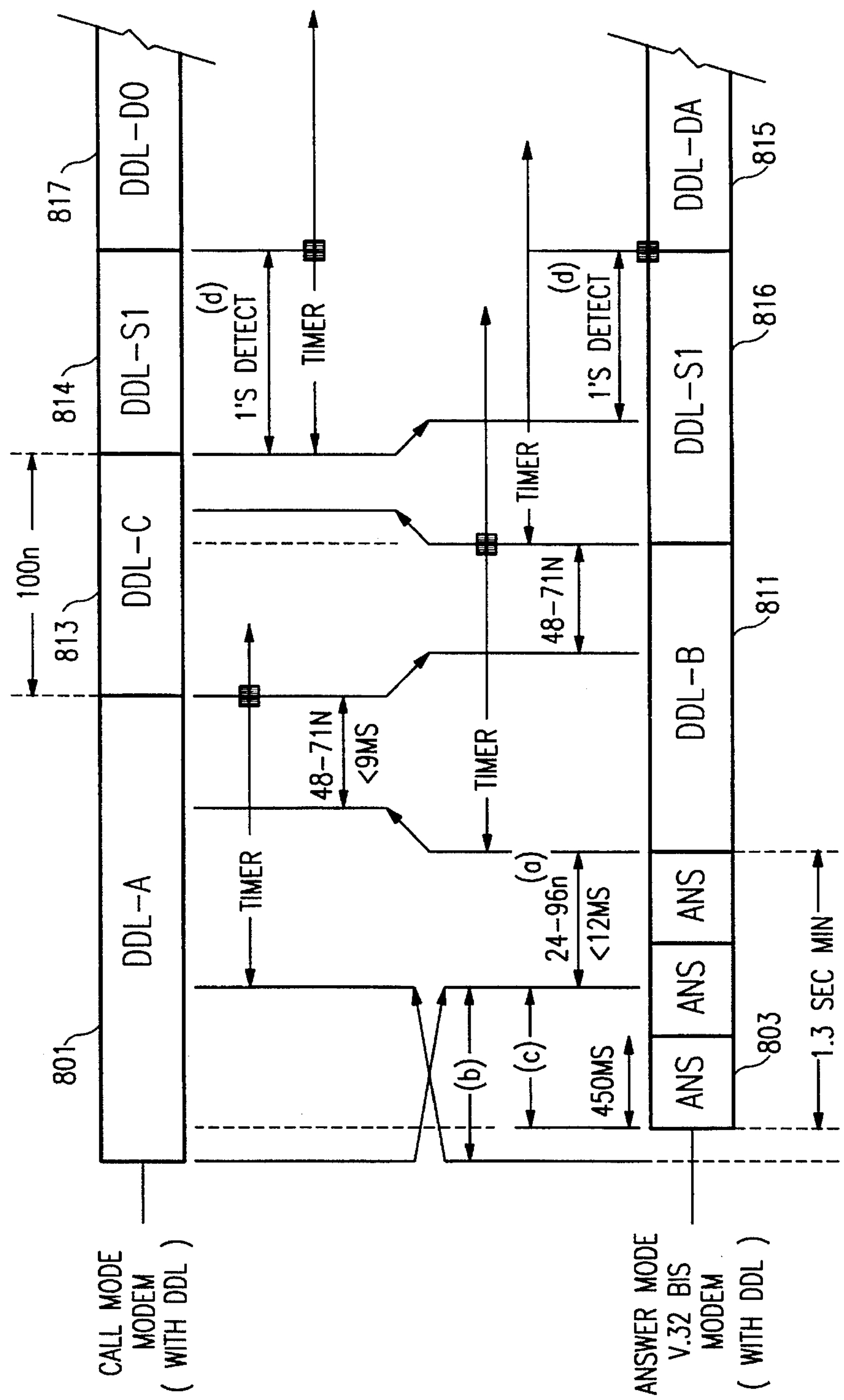
FIG. 9B is a timing diagram of the present invention for the case in which the answerer and the link are each capable of supporting digital communication.

In FIG. 9B, the timing for the present invention is shown for the case in which the answerer and the link are each capable of supporting digital communication. The originator initially transmits a DDL-A message 801. The answerer answers the call in accordance with a standard CCITT analog modulation scheme, such as V.32bis, in the same way as in FIG. 9A. Thus, the answerer transmits a V.25 answer tone with phase inversions 803. The originator detects the V.25 tone and at time 805 starts a timer. However, at the end of the V.25 tone 803, the answerer transmits a complete DDL-B data pattern 811 having successfully detected the DDL-A pattern transmitted by the originator. The originator detects the complete DDL-B data pattern before the timer expires 807. Therefore, in response to the DDL-B data pattern, the originator transmits a DDL-C data pattern 813 (i.e., the ORIGINATOR SELECT MESSAGE). The DDL-C pattern 813 is transmitted for a fixed time interval, followed by a DDL-S1 pattern 814. A timer is started when the originating equipment begins transmitting the DDL-S1 pattern 814. The answering equipment starts a timer when it successfully detects the DDL-C pattern 813, and also begins transmitting a DDL-S1 pattern 816. When the originator successfully detects a fixed number of consecutive scrambled "1"s sequence before the originator's timer expires, then the originator can transmit user-supplied digital data DDL-DO 817. When the answerer successfully detects a fixed number of consecutive scrambled "1"s before its timer expires, then the answerer transmits user-supplied digital data DDL-DA 815. Timer expiration on the originator or the answerer can be used as a means of disconnection. Alternatively, the answerer can choose to provide V.25 answer tone, attempting to renegotiate with the originating equipment using analog modulation schemes. Likewise, the originator can alternatively choose to listen for recurrence of V.25 answer tone, and continue to renegotiate using an analog modulation scheme.

It can be seen from these two timing diagrams that the present invention provides a fast means for negotiating the type of communication and the data transfer rate in the case in which the answerer and the link are capable of supporting digital communications, as well as when either the answerer or the link is incapable of supporting digital communication. In contrast, in accordance with the prior art, digital communications would be impossible unless the originator and answerer were connected to the same ISDN island or by a dedicated line. Also, communication in accordance with the prior art would require a failed attempt by the originator to make a digital connection, and then a subsequent attempt to establish a voice link. Furthermore, in accordance with the prior art, if an answerer is capable of digital communication, but is not on the same ISDN island as an originator, then the originator would have to attempt a digital call and fail. The originator would then have to establish a voice link (which in accordance with a protocol such as V.32bis requires at least 10 seconds for training of the modems). Therefore, in addition to the fact that the present invention allows faster data transfer rates to be established between subscribers which each have digital capabilities, such subscribers using the present invention could, in many cases, begin transmitting data approximately 9 seconds before subscribers using prior art methods. Therefore, use of the present invention could allow an additional 504,000 bits of data to be transmitted, and an additional 504,000 bits of data to be received, before a prior art link transfers any information at all.

Hardware Configuration

FIG. 10 is a block diagram of the hardware of one embodiment of the present invention. The illustrated embodiment of the present invention includes a microprocessor 901 and associated random access memory (RAM) 903, and a digital signal processor (DSP) 905 and associated RAM 907. Information is transferred between the telephone network and the DSP 905 through an input/output telephone network interface (I/O TNI) 909. The I/O TNI provides an electrical interface to the network and manages the telephone network protocol in known fashion to allow information to be exchanged between the telephone network and the present invention.

Data is transferred between the DSP 905 and the microprocessor 901 through a bi-directional serial to parallel converter ("S/P converter") 911. The S/P converter 911 converts serial data received from the DSP 905 to parallel data and parallel data received from the microprocessor 901 to serial data. Data transferred between the microprocessor 901 and data terminal equipment is transferred through a second S/P convertor 913 and an input/output data network interface (I/O DNI) 915. The I/O DNI 915 manages the transfer of data in known fashion to allow the data to be transferred to and from the data network in accordance with the data network protocol.

When a call is to be placed by the present invention, the data terminal equipment communicates with the present invention on the data network in known fashion. This communication includes the address (e.g., telephone number) of the intended answerer. The microprocessor 901 instructs the DSP 905 to form a connection to the answerer in accordance with the above detailed protocol illustrated in FIGS. 9A and 9B. The microprocessor 901 controls the operation of the DSP 905, and passes data to be transmitted over the telephone network to the DSP 905. The microprocessor 901 is responsible for executing software stored in the RAM 903 for performing error correction, data compression, and interfacing with the data terminal equipment. The DSP 905 is responsible for executing software stored in the RAM 907 for implementing analog modulation schemes, digital modulation schemes, and controlling the interface between the present invention and the telephone network.

Data from the DSP 905 is transmitted to the I/O TNI to be placed on the telephone network. Concurrently, data is received from the answerer over the telephone network. The interface to the telephone network may be by any digital service, such as a BRI, PRI, or T1 service.

When a call is received by the present invention, information is coupled to the I/O TNI 909 from the telephone network. The information is then transferred to the DSP 905. The DSP 905 processes the received information to determine whether a DDL-A data pattern is present. The DSP 905 responds to the information that is received in accordance with the protocol depicted in FIGS. 9A and 9B and described above. Once the call is established, a sufficiently clear path for digital communication is confirmed to exist or not exist, and the transfer rate is determined, the data that is received is coupled to the microprocessor for decoding, descrambling, error detection/correction and decompression (if necessary). The S/P converter 913 in turn couples the information to the I/O DNI 915 to be transmitted to data terminal equipment over the data network.

It should be understood that, after the completion of the protocol described above and depicted in the timing diagram of FIGS. 9A and 9B, communication between the telephone network and data terminal equipment proceeds in accordance with protocols known in the prior art. However, the protocol established by, and implemented in, the present invention allows the communication to be established rapidly, and permits selection of the most efficient encoding method and fastest data transfer rate. Also, under many conditions, the present invention allows selection of an encoding method and data transfer rate that is known in the prior art, but which is not presently possible under particular conditions (e.g., use of digital techniques between an originator in one ISDN island and an answerer in another ISDN island).

The present invention thus detects 64 kbps capability through a digital network, detects the existence of robbed-bit signaling on trunks within the call path, thus limiting data transfer rate to 56 kbps or below, detects the existence of an all digital connection between originator and answerer for the duration of a single call, provides interference free interoperability with all standardized analog modulation schemes, provides a unique data encoding method which ensures echo cancelers remain disabled throughout a call, and provides a unique encoding method for information rates near 56 kbps (i.e., rates which are 56 kbps minus approximately 0.2% due to zero code suppression avoidance) and near 64 kbps (i.e., rates which are 64 kbps minus approximately 0.1% due to zero code suppression avoidance) which are immune to network equipment configured to provide zero code suppression.

A number of embodiments of the present invention have been described. Nevertheless, it will be understood that various modifications may be made without departing from the spirit and scope of the invention. For example, the protocol of the present invention may be managed by a DSP, such as the DSP 905 depicted in FIG. 10, or by a microprocessor or other programmable controller, such as the microprocessor depicted in FIG. 10, or by hardware dedicated to the task of generating and detecting the data patterns defined by the inventive protocol and responding in the prescribed manner to detected trigger conditions, such as the receipt of a DDL-B data pattern. Furthermore, In some GSTNs, fixed digital attenuations may be present in the calling path. The present invention may be adapted to take such distortion into account and thus allow digital communications over a calling path containing a fixed digital attenuation. Furthermore, the order and content of the probes may be varied. Also, the roles of the originator and answerer in accordance with the present invention may be reversed (such as is done in the well known "reverse mode"). Accordingly, it is to be understood that the invention is not to be limited by the specific illustrated embodiment, but only by the scope of the appended claims.

I claim:

1. A method for automatically detecting the characteristics of a call over a switched telephone network between an originating telephone endpoint (OTE) and an answering telephone endpoint (ATE), comprising the steps of:

a. transmitting a first digital probe from the OTE to the ATE;

b. monitoring by the OTE for receipt of a second digital probe responsive to the first digital probe and transmitted by the ATE;

c. indicating an operating capability of the ATE;

d. characterizing the call as digital if the second digital probe is received by the OTE; and e. transmitting a selection message in response to receiving the second digital probe by the OTE, the selection message providing operating parameters selected by the OTE in response to the indicated operating capability of the ATE.

2. The method of claim 1, wherein the maximum data transfer rate of the call is determined based upon the logical state of bits of the second digital probe.

3. The method of claim 2, wherein the data transfer rate is not greater than the maximum transfer rate indicated by the logical state of bits within the second digital data probe.

4. The method of claim 3, further including transferring data at the maximum data transfer rate indicated by the logical state of the bits within the second digital data probe.

5. The method of claim 3, further including transferring data at a data transfer rate that is not greater than the data transfer rate indicated by the logical state of the bits within the second digital data probe.

6. The method of claim 1, further including the step of deactivating signal processing equipment coupled to the switched telephone network upon transmission of a response by the ATE to initiation of a call by the OTE in order to reduce distortion of digital data communicated between the OTE and ATE.

7. The method of claim 6, wherein the signal processing equipment includes at least one echo canceler.

8. The method of claim 6, wherein the signal processing equipment includes at least one echo suppressor.

9. The method of claim 1, wherein the call is disconnected if the second digital probe is not received within a predetermined period of time.

10. The method of claim 1, wherein standard analog modulation techniques for establishing the call are attempted before disconnection, if the second digital probe is not received within a predetermined period of time.

11. The method of claim 1, wherein the selection message selects parameters which govern the transfer of data between the OTE and the ATE over the switched telephone network for the duration of the call.

12. The method of claim 11, wherein the parameters selected are from among a set of parameters indicated by the state of bits of the second digital probe.

13. The method of claim 1, wherein the first digital probe comprises the following bit pattern;

| | Order of Bit Transmission | | | | | | | |
|---|---|---|---|---|---|---|---|---|
| Order of sample transmission | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |
| | 0 | 1 | 1 | 1 | 1 | 1 | 1 | J |
| | 1 | 1 | 1 | 1 | 1 | 1 | 1 | J |

14. The method of claim 1, wherein the second digital probe comprises the following bit pattern;

| | Order of Bit Reception | | | | | | | |
|---|---|---|---|---|---|---|---|---|
| Order of Sample Reception | 1 | 0 | 0 | X | X | X | X | X |
| | 1 | 0 | 0 | X | X | X | X | X |
| | 0 | 0 | 0 | X | X | X | X | X |
| | 0 | 0 | 0 | X | X | X | X | X |

15. The method of claim 1, wherein the second digital probe comprises the following bit pattern;

| | Order of Bit Reception | | | | | | | |
|---|---|---|---|---|---|---|---|---|
| Order of Sample Reception | X | X | X | 0 | X | X | X | X |
| | X | X | X | 1 | $M_0$ | X | X | X |
| | X | X | X | 1 | $M_1$ | X | X | X |
| | | | | | . | | | |
| | | | | | . | | | |
| | | | | | . | | | |
| | X | X | X | 1 | $M_n$ | X | X | X |
| | X | X | X | 1 | P | X | X | X |

16. The method of claim 1, wherein the second digital probe comprises the following bit pattern;

| Order of Bit Reception | | | | | | | |
|---|---|---|---|---|---|---|---|
| X | X | X | X | X | 1 | J | J |

17. The method of claim 1, wherein the first digital probe includes a first plurality of samples and a second plurality of samples, the least significant bit within each of the first plurality of samples being in a first logic state, and the least significant bit in the second plurality of samples being in a second logic state, such that the least significant bit of at least one of the samples within the first digital probe will be inverted if robbed-bit signaling is used on the call path.

18. The method of claim 1, further including the step of:

a. transmitting samples encoded with digital end user information between the OTE and the ATE upon characterizing the call as digital.

19. The method of claim 18, wherein the samples encoded with digital end user information are framed as 8-bit samples.

20. The method of claim 19, wherein:

a. only the most significant bit of each 8-bit sample carries a bit of end user information and the second and third most significant bits of each 8-bit sample are set to logic state "0" if 8 kbps operation is selected;

b. only the first two most significant bits of each 8-bit sample carry bits of end user information if 16 kbps operation is selected;

c. only the first three most significant bits of each 8-bit sample carry bits of end user information if 24 kbps operation is selected;

d. only the first four most significant bits of each 8-bit sample carry bits of end user information if 32 kbps operation is selected;

e. only the first five most significant bits of each 8-bit sample carry bits of end user information if 40 kbps operation is selected;

f. only the first six most significant bits of each 8-bit sample carry bits of end user information if 48 kbps operation is selected;

g. only the first seven most significant bits of each 8-bit sample carry bits of end user information if 56 kbps operation is selected; and h. all 8 bits of each 8-bit sample carry bits of end user information if 64 kbps operation is selected.

21. The method of claim 20, further including the step of:

a. transmitting a predetermined number of samples in which each bit of each sample which is capable of carrying end user information is set to a logic "1" and scrambled prior to transmitting samples encoded with end user information.

22. The method of claim 20, further including the step of:

a. transmitting a predetermined number of samples in which each bit of each sample which is capable of carrying end user information is set to a predetermined logic state, prior to transmitting samples encoded with end user information.

23. The method of claim 20, further comprising the steps of:

a. determining whether 56 kbps operation is selected;

b. determining whether each of the six most significant bits of a sample are equal to a logic "0" state if 56 kbps operation is selected;

c. delaying the transmission of the end user information that would otherwise have been carried by the seventh most significant data bit of the sample; and d. delaying each subsequent bit of end user information by one bit.

24. The method of claim 20, further comprising the steps of:

a. determining whether 64 kbps operation is selected;

b. determining whether each of the seven most significant bits of a sample are equal to a logic "0" state if 64 kbps operation is selected;

c. setting the eighth most significant bit of a sample to a logic "1" state if 64 kbps operation is selected and each of the seven most significant bits of the sample are equal to a logic "0" state;

d. delaying the transmission of the end user information that would otherwise have been carried by the eighth most significant data bit of the sample; and e. delaying each subsequent bit of end user information by one bit.

25. A method for automatically detecting the characteristics of a call over a switched telephone network between an originating telephone endpoint (OTE) and an answering telephone endpoint (ATE), comprising the steps of:

a. transmitting a first digital probe from the OTE to the ATE;

b. monitoring at the OTE for receipt of a second digital probe responsive to the first digital probe and transmitted by the ATE;

c. transmitting a selection message in response to receipt of the second digital probe by the OTE, the selection message providing operating parameters for digital communication between the OTE and ATE; and d. characterizing the call as digital if the second digital probe is received by the OTE.

26. The method of claim 25, wherein the selection message comprises the following bit pattern;

| | Order of Bit Transmission | | | | | | | |
|---|---|---|---|---|---|---|---|---|
| Order of | S | 0 | 0 | 0 | X | X | X | X |
| Sample | S | 0 | 0 | 1 | $M_0$ | X | X | X |
| Transmission | S | 0 | 0 | 1 | $M_1$ | X | X | X |
| | | | | | . | | | |
| | | | | | . | | | |
| | | | | | . | | | |
| | S | 0 | 0 | 1 | $M_n$ | X | X | X |
| | S | 0 | 0 | 1 | P | X | X | X |

27. A method for automatically detecting the characteristics of a call over a switched telephone network between an originating telephone endpoint (OTE) and an answering telephone endpoint (ATE), comprising the steps of:

a. receiving by the ATE a first digital probe transmitted by the OTE;

b. characterizing the call as digital if the first digital probe is received by the ATE; and c. transmitting a second digital probe from the ATE to the OTE if the first digital probe is received, the second digital probe being transmitted by the ATE in response to receiving the first digital probe.

28. The method of claim 27, further including the step of:

a. transmitting samples encoded with digital end user information between the ATE and the OTE upon characterizing the call as digital and after transmitting the second digital probe.

29. An apparatus for detecting the characteristics of a call over a switched telephone network between an originating telephone endpoint (OTE) and an answering telephone endpoint (ATE), including:

a. means for transmitting a first digital probe from the OTE to the ATE;

b. means for monitoring at the OTE for receipt of a second digital probe responsive to the first digital probe and transmitted by the ATE; and c. means for characterizing the call as digital if the second digital probe is received.

30. An apparatus for automatically detecting the characteristics of a call over a switched telephone network between an originating telephone endpoint (OTE) and an answering telephone endpoint (ATE), including:

a. means for receiving by the ATE a first digital probe transmitted by the OTE;

b. means for characterizing the call as digital if the first digital probe is received by the ATE;

c. means for transmitting a second digital probe from the ATE to the OTE if the first digital probe is received by the ATE, the second digital probe being transmitted by the ATE in response to receiving the first digital probe;

d. means for indicating an operating capability of the ATE; and e. means for transmitting a selection message from the OTE to the ATE in response to receiving the second digital probe by the OTE, the selection message providing operating parameters selected by the OTE in response to indication of the operating capability of the ATE.

* * * * *